United States Patent
Otaki et al.

(10) Patent No.: US 7,347,115 B2
(45) Date of Patent: Mar. 25, 2008

(54) LINEAR ACTUATOR

(75) Inventors: Ryoichi Otaki, Fujisawa (JP); Tomofumi Yamashita, Fujisawa (JP)

(73) Assignee: NSK Ltd., Tokyo (JP)

(*) Notice: Subject to any disclaimer, the term of this patent is extended or adjusted under 35 U.S.C. 154(b) by 660 days.

(21) Appl. No.: 10/505,095

(22) PCT Filed: Feb. 17, 2003

(86) PCT No.: PCT/JP03/01626

§ 371 (c)(1),
(2), (4) Date: Aug. 19, 2004

(87) PCT Pub. No.: WO03/071163

PCT Pub. Date: Aug. 28, 2003

(65) Prior Publication Data

US 2005/0155444 A1 Jul. 21, 2005

(30) Foreign Application Priority Data

| Feb. 20, 2002 | (JP) | ............................ 2002-043152 |
| Mar. 28, 2002 | (JP) | ............................ 2002-091381 |
| Apr. 25, 2002 | (JP) | ............................ 2002-124051 |
| Jun. 24, 2002 | (JP) | ............................ 2002-182648 |
| Jun. 26, 2002 | (JP) | ............................ 2002-185891 |
| Nov. 14, 2002 | (JP) | ............................ 2002-330915 |

(51) Int. Cl.
*F16H 25/20* (2006.01)
(52) U.S. Cl. .................... 74/89.38; 74/89.39; 74/89.37
(58) Field of Classification Search ............... 74/89.37, 74/89.38, 89.39
See application file for complete search history.

(56) References Cited

U.S. PATENT DOCUMENTS

| 3,583,248 | A | * | 6/1971 | Langenberg | ............... 74/89.39 |
| 5,086,900 | A | * | 2/1992 | Kikuta et al. | ........... 192/142 R |
| 5,299,853 | A | * | 4/1994 | Griswold et al. | ...... 297/362.12 |
| 5,461,935 | A | * | 10/1995 | Hill | ............................ 74/89.38 |
| 5,916,325 | A | * | 6/1999 | Madrid et al. | ............. 74/89.38 |
| 6,240,797 | B1 | * | 6/2001 | Morishima et al. | ........ 74/89.39 |
| 6,981,428 | B2 | * | 1/2006 | Donald et al. | ............. 74/89.26 |
| 2006/0016281 | A1 | * | 1/2006 | Donald et al. | ............. 74/89.26 |

FOREIGN PATENT DOCUMENTS

JP 7-305753 11/1995

(Continued)

*Primary Examiner*—David M. Fenstermacher
(74) *Attorney, Agent, or Firm*—Miles & Stockbridge P.C.

(57) ABSTRACT

A rotary shaft and a rotation driven member are connected as to transmit motive power when the rotary shaft rotates relatively to the rotation driven member. A roller gets displaced to a first position where a frictional force with an outer race and the rotation driven member decreases, thereby permitting transmission of a rotational force from the rotary shaft to the rotation driven member. When the rotation driven member rotates relatively to the rotary shaft, the roller gets displaced to a second position where the frictional force with the outer race and the rotation driven member increases, thereby rotationally fixing the rotation driven member with respect to the outer race. The power transmission from a brake apparatus to an electric motor can be hindered while permitting the power transmission to the brake apparatus from the electric motor by using either a worm exhibiting a relatively low transmission efficiency or a worm wheel.

25 Claims, 28 Drawing Sheets

FOREIGN PATENT DOCUMENTS

| | | |
|---|---|---|
| JP | 7-317870 | 12/1995 |
| JP | 9-191607 | 7/1997 |
| JP | 11-46467 | 2/1999 |
| JP | 11-344094 | 12/1999 |
| JP | 2001-106060 | 4/2001 |
| JP | 2001-337009 | 12/2001 |
| JP | 2003-81106 | 3/2003 |
| WO | WO 97/06373 | 2/1997 |
| WO | WO 00/22322 | 4/2000 |

* cited by examiner

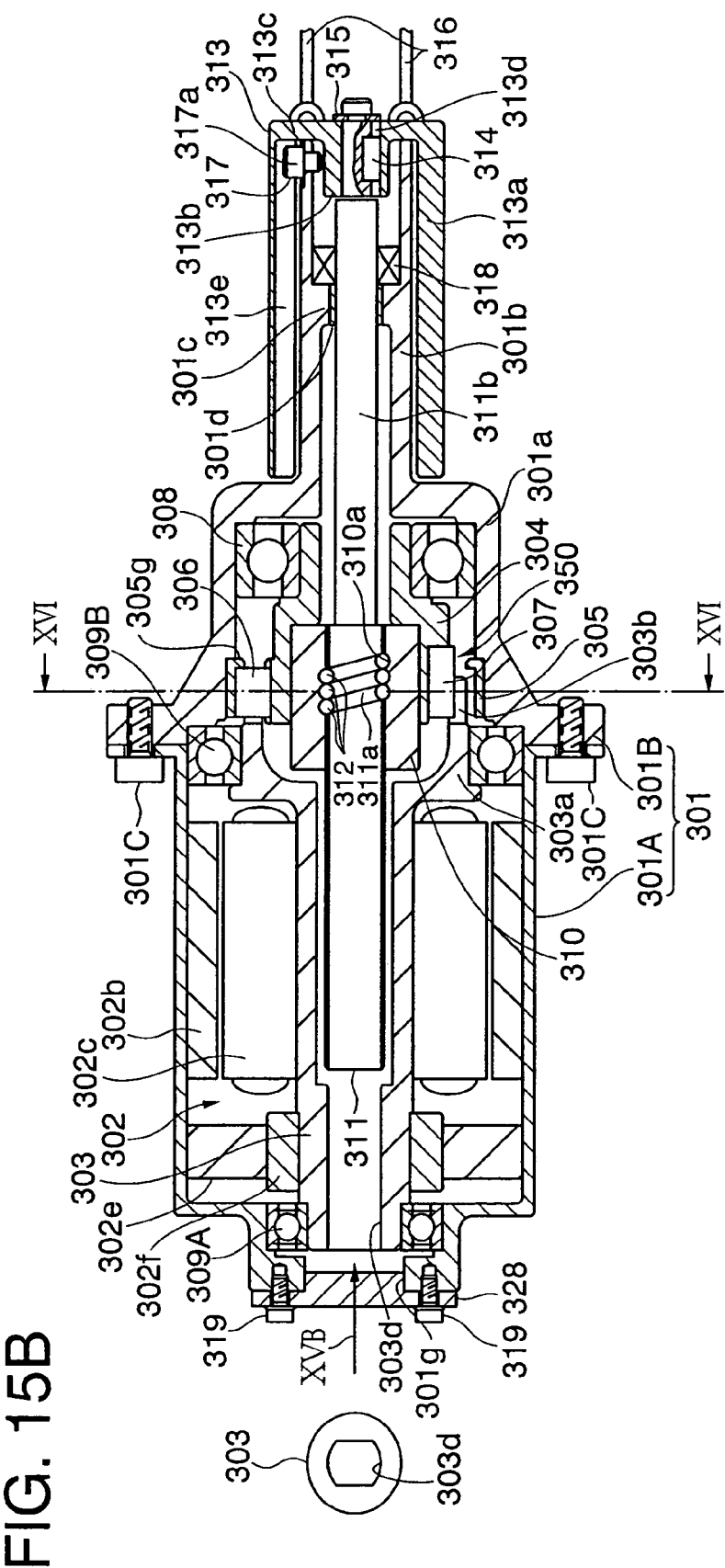

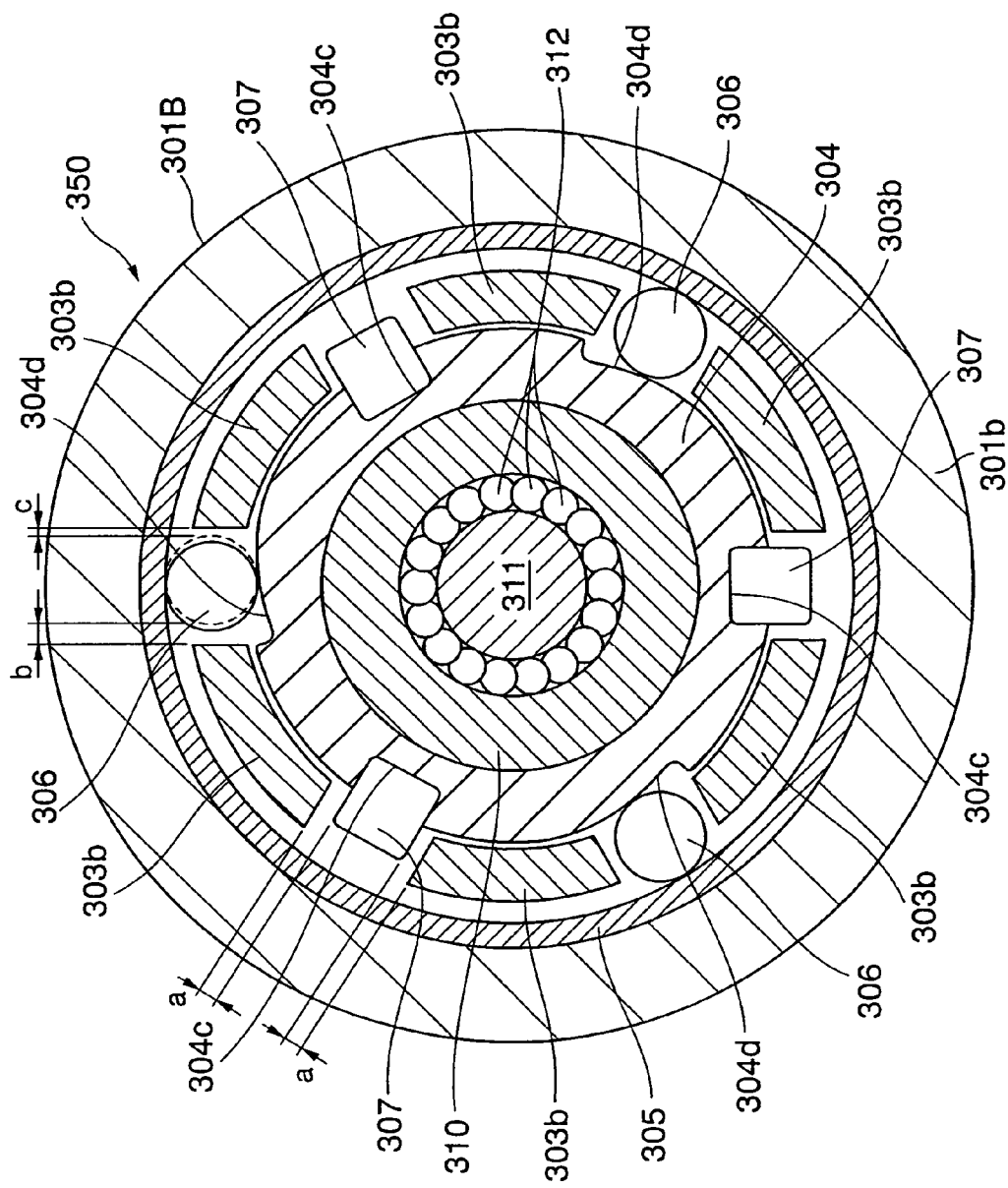

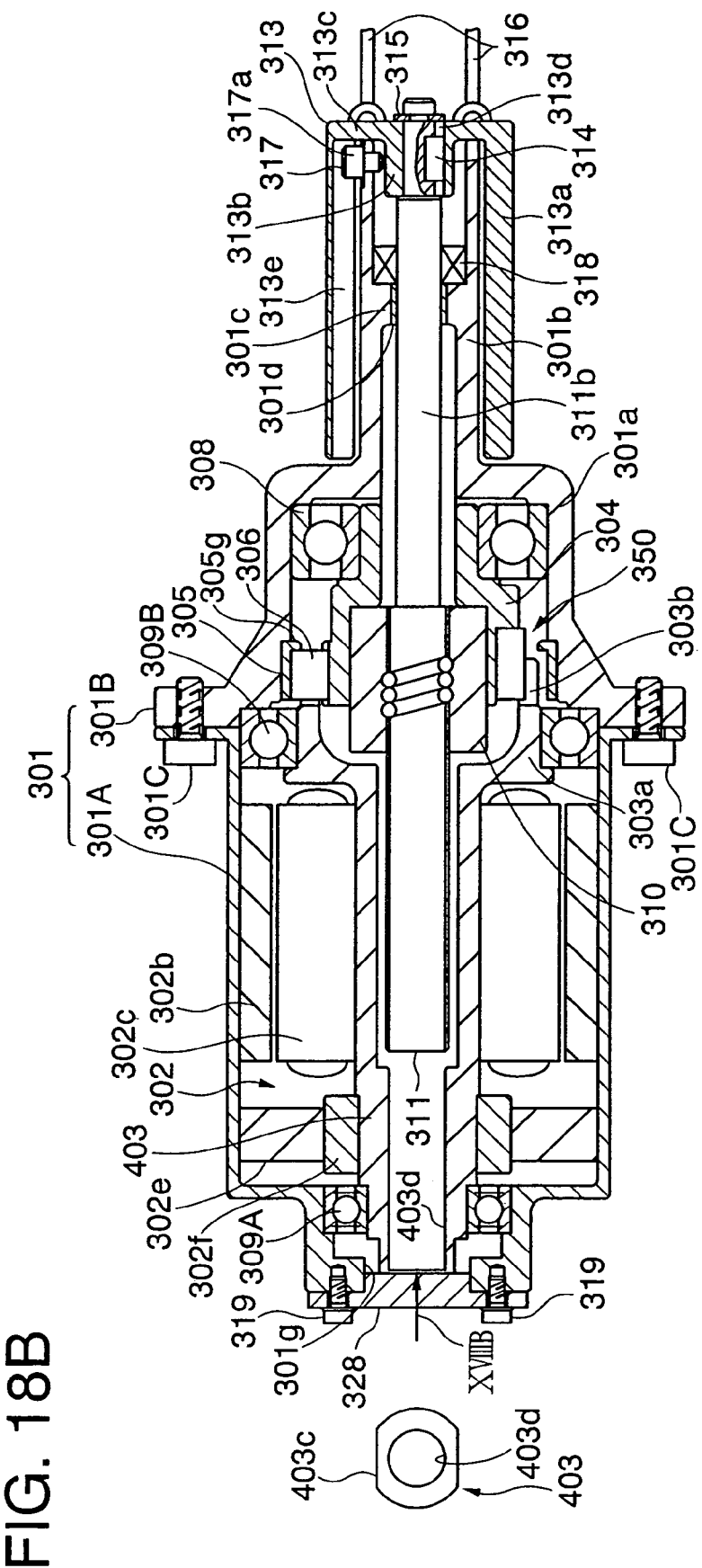

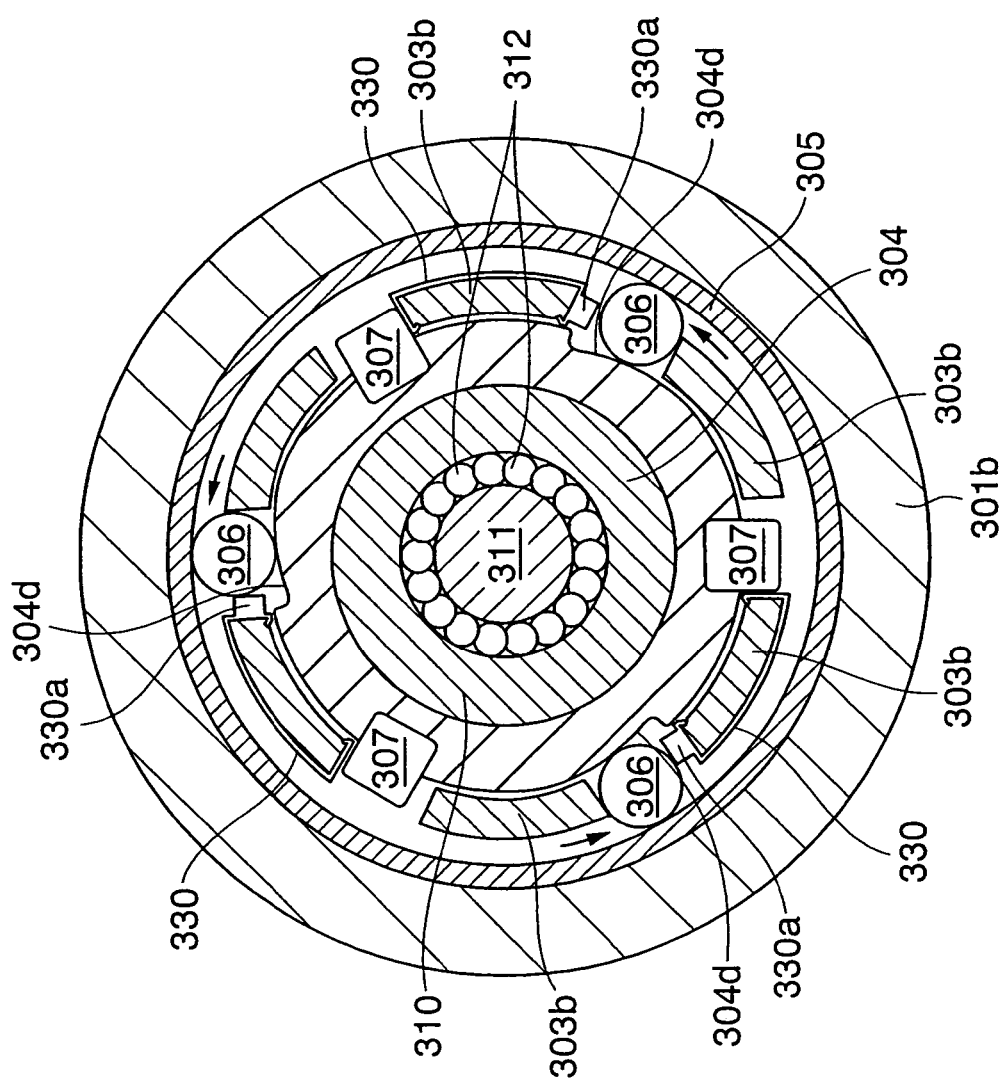

LINEAR ACTUATOR

TECHNICAL FIELD

The present invention relates to a linear actuator using an electric motor as a power source that can be applied to, for example, a power window of an automobile, a wire winding mechanism of an electric parking brake apparatus, a caliper extrusion mechanism of an electric disk brake apparatus, a cam phase converting mechanism in a valve timing variable apparatus of an engine, a belt CTV pulley drive mechanism, etc., a 2-wheel-drive/4-wheel-drive switching mechanism of a 4WD apparatus, and other industrial apparatuses such as a winch, a hoist, a crane and a variety of positioning apparatuses.

BACKGROUND ARTS

Known, for instance, is a linear actuator for an electric parking brake drive apparatus, etc., which reduces a load on a driver by employing motive power of an electric motor when operating a parking brake of a vehicle. This type of linear actuator is proposed, wherein a parking brake is operated by wining up a cable in a way that rotates a pulley with an electric motor, and is canceled by rewinding the cable (refer to Japanese Patent Application Laid-Open Publication No. 2001-106060).

In the linear actuator disclosed in the aforementioned Publication, the motive power from the electric motor is decelerated and thus transmitted to a parking brake by use of a worm gear and a worm wheel. The power transmission conducted by employing the worm gear and the worm wheel has such a merit that a speed reduction ratio can be taken large, and the motive power from the parking brake can be prevented from being transmitted to the electric motor side by properly designing a torsional angle of the worm.

On a reversed side of this merit, however, the worm gear and the worm wheel have a demerit that the transmission efficiency is low. Therefore, an output of the electric motor must be increased for operating the parking brake, resulting in such a problem that the electric motor increases in size and is unable to scheme to save the electric power. Further, in the case of using the linear actuator other than the parking brake apparatus, some have a moment force generated at a movable portion, and there arises a problem about how to sustain this.

DISCLOSURE OF THE INVENTION

The present invention, which was devised in view of the problems inherent in the prior art described above, aims at providing a linear actuator for cutting off transmission of motive power to an electric motor from a driven member while ensuring a transmission efficiency.

A linear actuator for driving a driven member according to the present invention comprises housing, an electric motor attached to the housing, and a power transmission mechanism for transmitting motive power of the electric motor to the driven member, the power transmission mechanism including a fixing portion, a rotation driving portion so connected to the electric motor as to be capable of transmitting the motive power, a rotation driven portion receiving a rotational force from the rotation drive portion and getting rotationally displaced, a converting mechanism for converting a rotational motion of the rotation driven portion into an axis-line directional motion of a movable member so connected to the driven member as to be capable of transmitting the motive power, and a lock member disposed between the fixing portion and the rotation driven member, wherein when a rotational force is inputted to the rotation diving portion to rotate the rotation driven portion, the lock member is guided to a first position in which there decreases a frictional force with the fixing portion and the rotation driven portion, the transmission of the rotational force to the rotation driven portion from the rotation driving portion is thereby permitted; when the rotational force is inputted to the rotation driven portion to rotate the rotation driving portion relatively in one direction, the lock member is guided to a second position in which there increases the frictional force with the fixing portion and the rotation driven portion, the rotation to the rotation driving portion from the rotation driven portion is thereby fixed, and the rotation driven portion receives a force from the driven member so as to rotate in one direction at least in a state where the driven member is driven.

The linear actuator according to the present invention is the linear actuator for driving a driven member comprising the housing, the electric motor attached to the housing, and the power transmission mechanism for transmitting motive power of the electric motor to the driven member. The power transmission mechanism includes the fixing portion, the rotation driving portion so connected to the electric motor as to be capable of transmitting the motive power, the rotation driven portion receiving the rotational force from the rotation drive portion and getting rotationally displaced (making a rotational motion), the converting mechanism for converting the rotational motion of the rotation driven portion into the axis-line directional motion of the movable member so connected to the driven member as to be capable of transmitting the motive power, and the lock member disposed between the fixing portion and the rotation driven member. When the rotational force is inputted to the rotation diving portion to rotate the rotation driven portion, the lock member is guided to the first position in which there decreases the frictional force with the fixing portion and the rotation driven portion, the transmission of the rotational force to the rotation driven portion from the rotation driving portion is thereby permitted. When the rotational force is inputted to the rotation driven portion to rotate the rotation driving portion relatively in one direction, the lock member is guided to the second position in which there increases the frictional force with the fixing portion and the rotation driven portion, the rotation to the rotation driving portion from the rotation driven portion is thereby fixed (i.e., the transmission of the rotational force is inhibited), and the rotation driven portion receives the force from the driven member so as to rotate in one direction at least in the state where the driven member is driven. With this construction, the transmission efficiency can be improved much higher than by the worm and the worm wheel that have hitherto been used. Besides, the power transmission from the driven member to the electric motor can be hindered while permitting the power transmission to the driven member (e.g., a wire for driving a parking brake apparatus) from the electric motor. Hence, a capacity of the electric motor can be reduced, and the electric power can be saved. Moreover, at least in the state where the driven member is driven, the lock member receives the force from the driven member and is thereby biased toward the second position. The construction of the power transmission mechanism can be simplified and costs can be decreased to such an extent.

It should be noted that [the first position where the frictional force decreases] and [the second position where the frictional force increases] imply a relative relationship that when the lock member gets displaced, the frictional force between the lock member, the fixing portion and the rotation driven portion becomes higher in the second position than in the first position. For example, in an embodiment that will hereinafter be described, the first position is a position close to an axis of rotation on a cam surface inclined in one direction, while the second position is a position apart from the axis of rotation on this cam surface.

Further, it is preferable that the converting mechanism includes a ball screw mechanism including a nut connected to a screw shaft, a ball and the rotation driven portion, because the rotational displacement of the rotation driven portion can be efficiently converted into the axis-line-directional displacement of the screw shaft, and further because the linear actuator can be restrained in a compact construction.

It is also preferable that at least part of an axis-directional engagement portion between the rotation driving portion, the rotation driven portion is within a ball existing range of the ball screw mechanism, wherein the motive power can be stably transmitted.

By the way, the nut member used for this type of linear actuator needs to be provided with a circulation path for circulating the ball from one end of the other end of a transfer path formed between the screw shaft and the nut member. If an outer peripheral surface of the nut member is cut for providing this circulation path, however, when the nut member rotates at a high speed, shake-around occurs due to unbalance thereof, and vibrations increase, with the result that, for instance, bite-in of the ball is easy to occur. In such a case, there might be induced an unexpected situation, wherein the nut member is locked to the screw shaft.

In order to obviate the unbalance of the nut member described above, according to, e.g., Japanese Patent Application Laid-Open Publication No. 11-344094, a tube for forming the circulation path is provided extending over an outside diameter of the nut member. In the construction of the prior art described above, the tube member is formed extending over the outside diameter of the nut member, and it is therefore difficult to work a member embracing the nut member, resulting in an increase in manufacturing costs.

By contrast, when the nut member has a circulation path for circulating the ball and is formed with a balancing cut portion on an outer peripheral surface on an opposite side with the axis line being interposed therebetween with respect to the circulation path, even in the case of cutting the outer peripheral surface of the nut member for providing the circulation path, the balancing cut portion is provided in a position showing a rotational symmetry about it, thereby obviating or moderating the unbalance of the nut member and enabling the high-speed drive to be attained. Besides, there is no necessity of providing the member extending over the outside diameter of the nut member for obviating or moderating the unbalance. It is therefore sufficient that a hole substantially equal to the outside diameter of the nut member is formed in the member embracing the nut member, thereby facilitating the manufacture thereof.

Further, when at least one of a tube member formed with the circulation path and a press member for pressing the tube member is formed of a material having a specific gravity that is larger than that of the nut member, even in the case of cutting the outer peripheral surface of the nut member for providing the circulation path, a much heavier tube member and press member are employed even if the same degree of volume as in the prior art is given, thereby obviating or moderating the unbalance of the nut member and enabling the high-speed drive to be attained. Besides, there is no necessity of providing the member extending over the outside diameter of the nut member for obviating or moderating the unbalance. It is therefore sufficient that a hole substantially equal to the outside diameter of the nut member is formed in the member embracing the nut member, whereby the manufacture thereof is facilitated. Incidentally, it can be considered that materials each having a larger specific gravity than that of the nut member can be, if the nut member is composed of steel, exemplified such as copper, nickel, lead, tungsten and alloys containing these elements, but are not limited to those.

Moreover, the housing shields the power transmission mechanism in a state where the screw shaft can protrude outside. The housing includes a movable case attached to the screw shaft protruding from the housing, getting displaced together with the screw shaft in the axis-line direction with respect to the housing and incapable of a relative rotation with respect to the housing, and the movable case is so connected to the driven member as to be capable of transmitting the motive power. With this construction, the protruded screw shaft can be covered with the movable case, thereby making it possible to restrain foreign matters such as dusts from entering the housing and the movable case even when the screw shaft moves and to restrain the rotation of the screw shaft through the movable case. A secure operation of the ball screw mechanism can be thereby attained.

Further, a buffer member for buffering an impact when the movable case or the screw shaft abuts, is disposed in the housing. This configuration makes it feasible to restrain emission of butting noises and an occurrence of impression in the butting portion, and so on.

Still further, it is preferable that the nut is the rotation driven portion, whereby the number of components can be decreased.

Yet further, it is preferable that a cam surface is formed on part of an outer peripheral surface of the nut, and the lock member moves along the cam surface between the first position and the second position.

Moreover, the converting mechanism includes ball screw mechanism having a screw shaft connected to the rotation driven portion, a ball and a nut, whereby the rotational displacement of the rotation driven portion can be efficiently converted into the axis-line directional displacement of the nut. Furthermore, the nut can be used in a way that arbitrarily moves the nut within a hermetically-sealed box body.

Further, an output shaft of the electric motor and the screw shaft are coaxially connected in a butting state through a bush and the rotation driven portion, whereby positioning in the axis-line direction can be properly performed.

Additionally, it is preferable that there are provided at least a bearing for rotatably supporting one side end of the screw shaft and a bearing for rotatably supporting the rotation driven portion.

Still additionally, it is preferable that the nut is supported on the screw shaft in at least two positions with its thread groove being interposed therebetween. With this contrivance, even when the nut receives a moment force from the driven member, it is possible to restrain conflicts between the balls rolling along the thread grooves within the nut.

Moreover, it is preferable that a cam surface is formed on part of an outer peripheral surface of the rotation driven portion, and the lock member moves along the cam surface between the first position and the second position.

Incidentally, in this type of linear actuator, the driven member can not be moved without the output of the electric motor. Consequently, in the case of adjusting, for instance, a play of the wire when mounted on a vehicle, it is laborious that the electric motor must be supplied with the electric power each time. Particularly when delivering the linear actuator as a product, a request is that the linear actuator be as compact as possible in terms of facilitation of packaging and handling. If delivered in a state where an operating portion is reduced, however, the operating portion must be extended for connecting to the wire of the parking brake when assembled, and the electric motor is supplied with the electric power each time. This leads to an increase in the number of assembling steps of the vehicle.

In contrast, an aperture is provided in a position facing an axial center of the rotation driving portion in the housing, wherein in the case of adjusting the play of the wire when mounted on the vehicle, the rotation driving portion can be rotated by use of the tool without supplying the electric motor with the electric power, so that the adjustment can be conducted simply and easily. This yields a merit that the number of assembling steps of the vehicle can be restrained even when delivering the linear actuator in the compact state where the movable member of the linear actuator is reduced. Incidentally, another merit is that when a spring member for biasing the lock member toward the second position is provided, interference between the lock member and the spring member can be avoided by rotating the rotation driving portion in the way described above.

Further, it is preferable that there is provided a cover for shielding the aperture of the housing, whereby the foreign matters can be prevented from entering the interior of the housing via the aperture from the outside.

Still further, part of the rotation driving portion protrudes from the aperture provided in the housing. If, e.g., the tool is engaged with this protruded rotation driving portion, in the case of adjusting the play of the wire when mounted on the vehicle, the rotation driving portion can be rotated by use of the tool without supplying the electric motor with the electric power, so that the adjustment can be performed simply and easily. This yields the merit that the number of assembling steps of the vehicle can be restrained even when delivering the linear actuator in the compact state where the movable member of the linear actuator is reduced. Incidentally, another merit is that when the spring member for biasing the lock member toward the rotation hindering position is provided, the interference between the lock member and the spring member can be avoided by rotating the rotation driving portion in the way described above.

Moreover, it is preferable that an outer surface of a free end of the rotation driving portion on the side with which the rotation driven portion does not engage, is formed in a polygonal shape coaxial with the rotation (driving) portion, whereby it is easy to transmit the rotational force from the tool engaging with the outer surface.

Alternatively, it is preferable that a free end of the rotation driving portion on the side with which the rotation driven portion does not engage, is formed with a hole having an inner peripheral surface taking a polygonal shape coaxial with the rotation driving portion, whereby it is easy to transmit the rotational force from the tool engaging with the hole, and hence a length in the axis-line direction can be restrained.

Further, it is preferable that at least one of the screw shaft and the nut is disposed inward in a direction of a coil or a magnet of the electric motor.

Still further, the power transmission mechanism includes a planetary type speed reduction gear for transmitting the motive power of the electric motor. Though compact in construction, a comparatively large speed reduction ratio can be given by use of the planetary type speed reduction gear. Hence, even when the power transmission driven portion requires a high load, the electric motor having a small capacity suffices, and it is feasible to decrease the cost and to downsize the configuration.

Yet further, the planetary type speed reduction gear has a sun gear connected to a rotary shaft of the electric motor, a planetary gear meshing with the sun gear and a carrier for rotatably supporting the planetary gear, and the rotation driving portion is connected to the carrier, whereby a space can be effectively utilized without increasing the number of components.

Additionally, at least one of the screw shaft and the nut is disposed inward in a radial direction of the planetary type speed reduction gear, thereby making it possible to effectively utilize the space and to restrain the axis-line-directional length of the linear actuator.

Moreover, it is preferable that the power transmission mechanism includes a driving body for driving the lock member when rotating the rotation driven portion upon inputting the rotational force to the rotation driving portion, and a restricting member for restricting the drive of the driving body when the driving body tries to drive the lock member toward the second position from the first position. When the rotations should be transmitted, the restricting member hinders the drive body from driving the lock member toward the second position from the first position, whereby the rotational force from the rotation driving portion is smoothly transmitted to the rotation driven portion.

Furthermore, it is preferable that the power transmission mechanism includes a driving body for driving the lock member when rotating the rotation driven portion upon inputting the rotational force to the rotation driving portion, and a protruded portion so provided as to protrude in a radial direction from the rotation driven portion and serving to transmit the rotational force to the rotation driven portion from the rotation driving portion in a way that abuts on the driving body, whereby the rotational force from the rotation driving portion is smoothly transmitted via the protruded portion to the rotation driven portion.

BRIEF DESCRIPTION OF THE DRAWINGS

FIGS. 15A and 15B are sectional views of the linear actuator in an eighth embodiment;

FIG. 16 is a view showing a construction cut off along the line XVI-XVI in FIG. 15A as viewed in an arrowhead direction;

FIGS. 18A and 18B are sectional views of the linear actuator in a ninth embodiment;

FIG. 20A is a sectional view, similar to FI, 16, showing a construction of the electric parking brake drive apparatus in an eleventh embodiment; FIG. 20B is a front view of a spring member;

FIG. 28B is a sectional view, similar to FIG. 27, showing a state where this nut is actually assembled in;

FIG. 29B is a sectional view, similar to FIG. 27, showing a state where this nut is actually assembled in;

FIG. 30B is a sectional view, similar to FIG. 27, showing a state where this nut is actually assembled in;

BEST MODE FOR CARRYING OUT THE INVENTION

Figure 1:
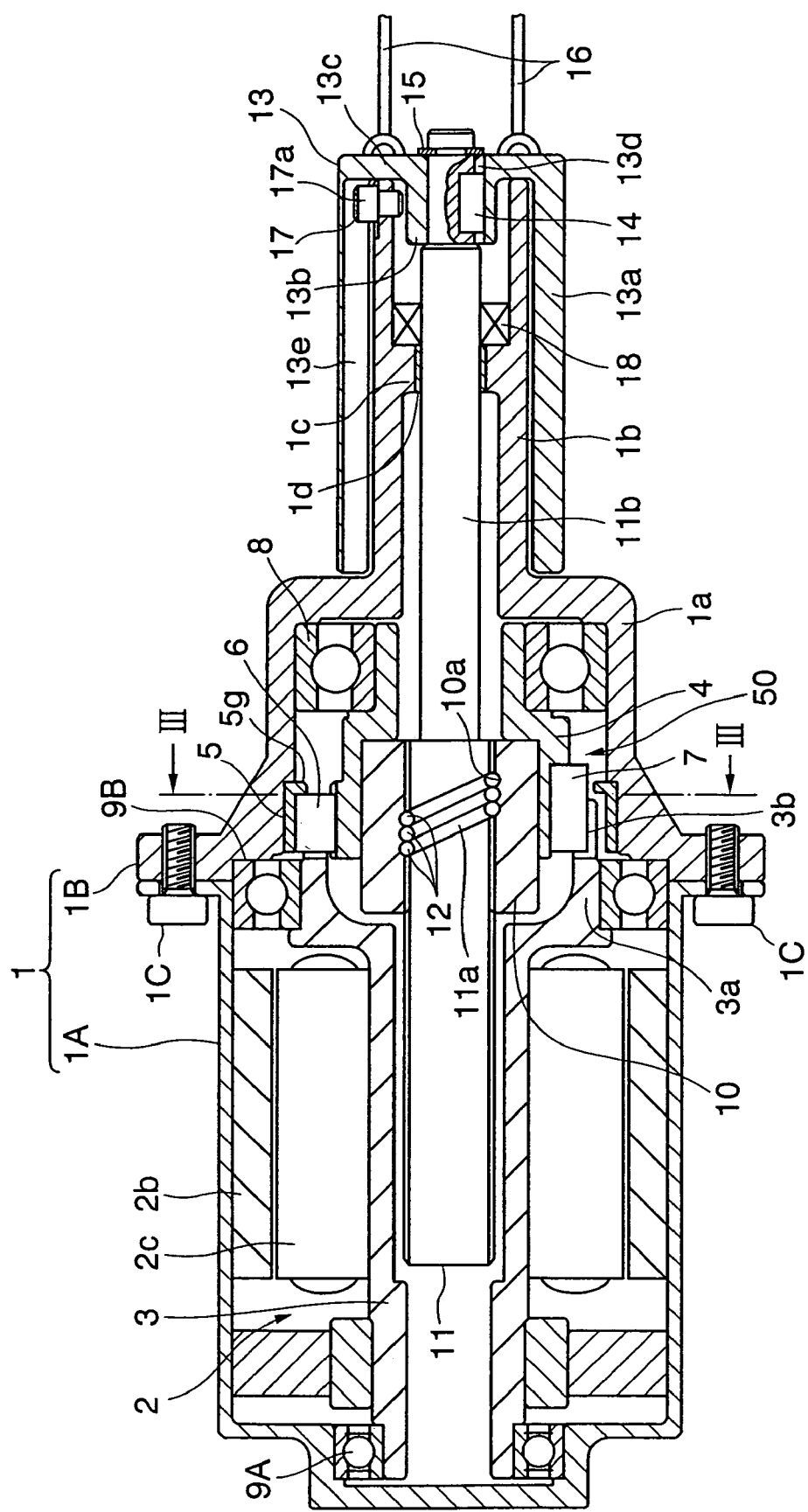
FIG. 1 is a sectional view of an electric parking brake drive apparatus in a first embodiment.
Figure 2:
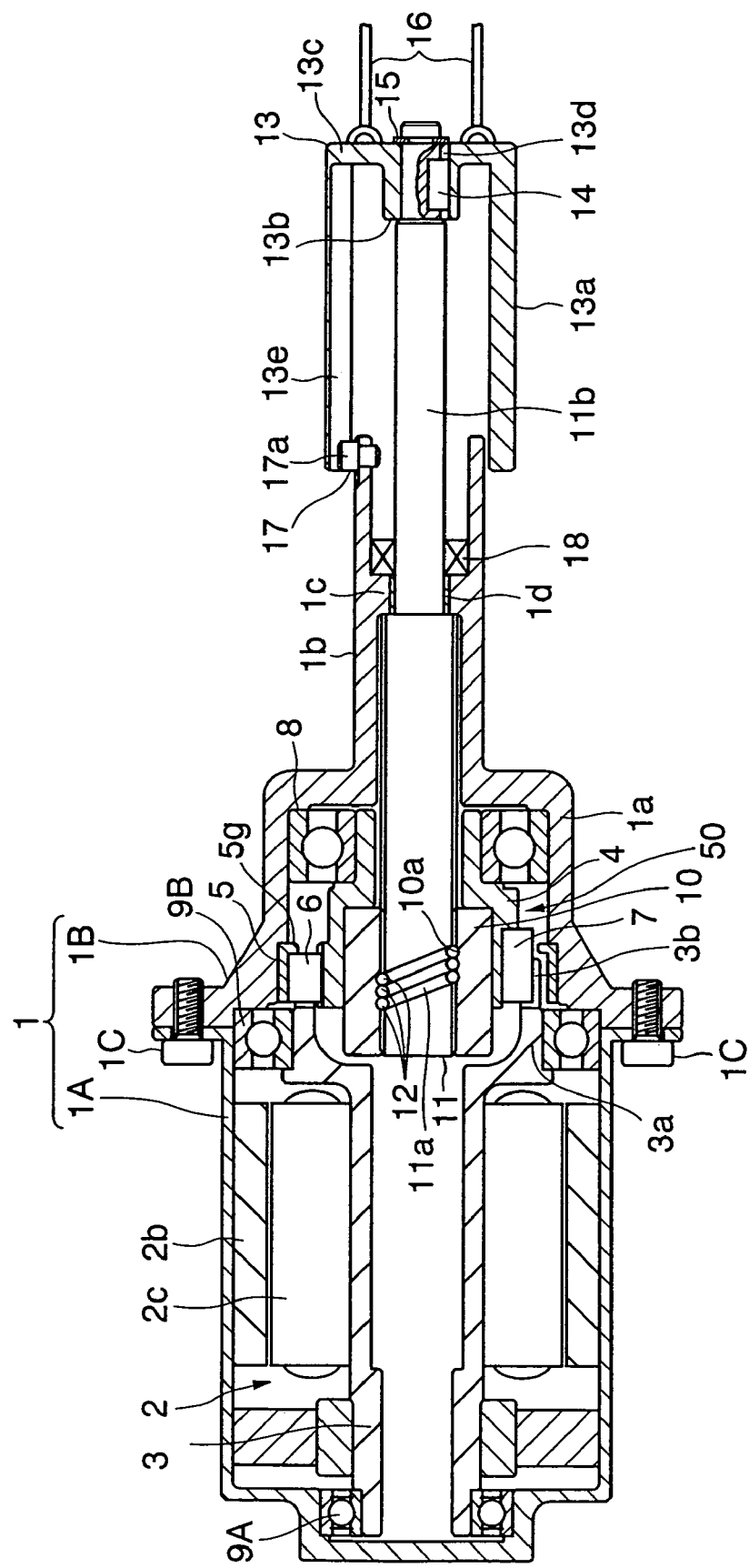
FIG. 2 is a sectional view of the electric parking brake drive apparatus in the first embodiment.
Figure 3:
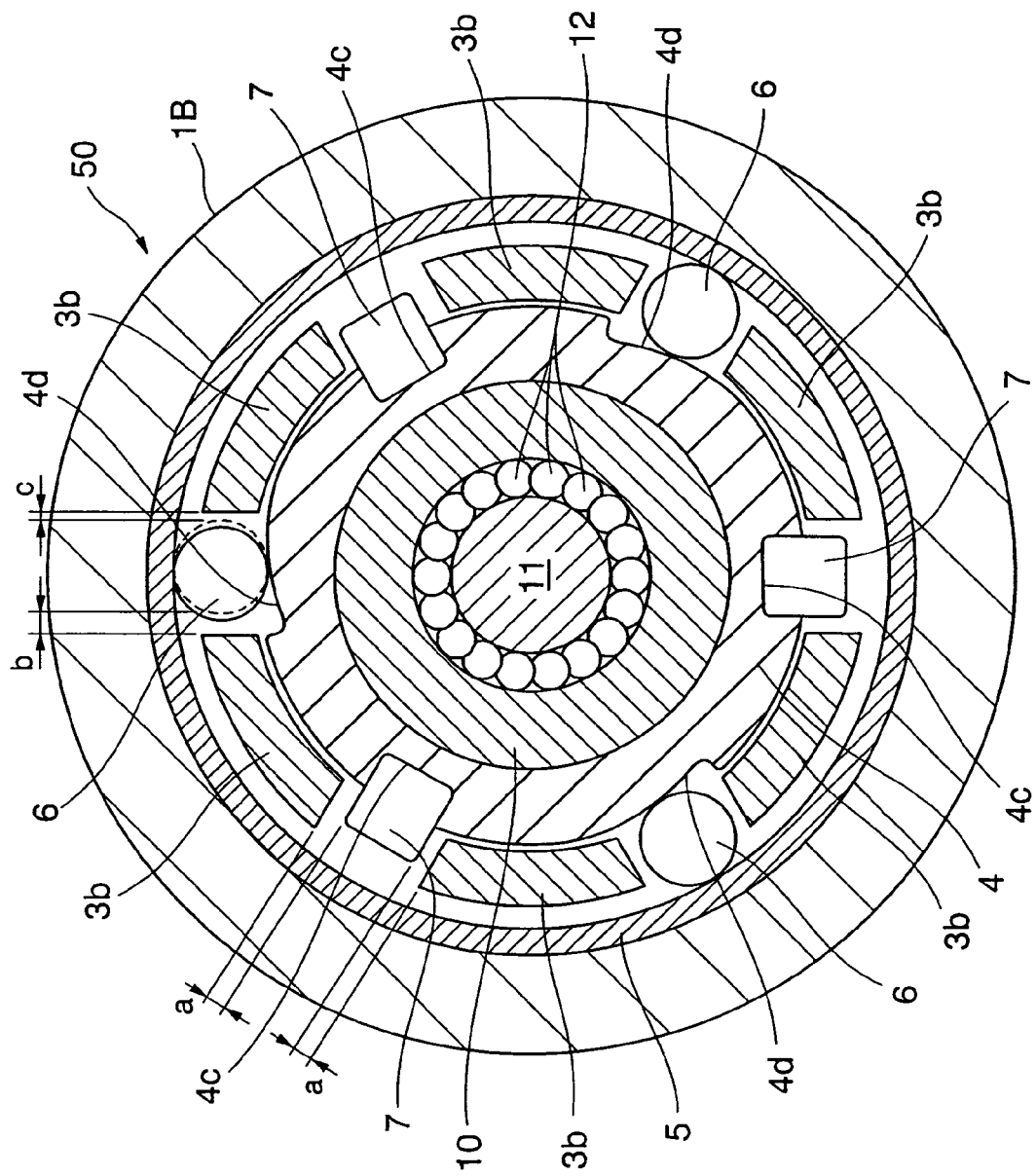
FIG. 3 is an enlarged view showing a construction cut off along the line III-III in FIG. 1 as viewed in an arrowhead direction.

Next, embodiments of the present invention will hereinafter be described with reference to the drawings. FIG. 1 is a sectional view of an electric parking brake drive apparatus when in a braking operation by way one example of a linear actuator in a first embodiment. FIG. 2 is a sectional view of this type of electric parking brake drive apparatus when released from braking. FIG. 3 is a view showing a construction cut off along the line III-III in FIG. 1 as viewed in an arrowhead direction.

In FIG. 1, housing 1 is constructed of cylindrical motor housing 1A and cylindrical main housing 1B that are connected to each other via a bolt 1C. A cylindrical stator 2b is fixed to an inner peripheral surface of the motor housing 1A, and embraces a rotor 2c. The rotor 2C is attached to an outer peripheral surface of a rotary shaft 3 of which a left side end is, as viewed in FIG. 1, rotatably supported via a bearing 9A with respect to the motor housing 1A, whereby the rotary shaft 3 and the rotor 2c rotate together. An electric motor 2 has the stator 2b, the rotor 2c and the rotary shaft 3.

The rotary shaft 3 is hollowed and is formed with, at a right side end in FIG. 1, a large-diameter portion 3a rotatably supported via a bearing 9B with respect to the motor housing 1A, and a plurality of pawl portions 3b (six pieces are provided in this example) protruding from the large-diameter portion 3a in an axis-line direction. Note that an outer race of the bearing 9B is fitted to both of the inner peripheral surface of the motor housing 1A and the inner peripheral surface of the main housing 1B, whereby the main housing 1B and the electric motor 2 are aligned with each other. This contrivance that the outer race of the bearing 9B is fitted to both of the inner peripheral surface of the motor housing 1A and the inner peripheral surface of the main housing 1B, is convenient to handle, for instance, in the case of assembling and making an inspection because of the rotary shaft 3 being supported on the two bearings 9A and 9B even when the main housing 1B is separated from the motor housing 1A.

The main housing 1B takes such a configuration as to connect a major cylindrical portion 1a and a minor cylindrical portion 1b to each other. An outer race 5 defined as a fixing portion is fitted to an inner peripheral surface of the major cylindrical portion 1a. As lock members, rollers 6 (three pieces are provided in this example) and keys 7 (three pieces are provided in this example) are so disposed as to be alternately pinched in between the adjacent pawl portions 3b inwards in a radial direction of the outer race 5. The outer race 5 has a flange portion 5g protruding inwards in the radial direction at a right side end in FIG. 1, and this flange portion 5g prevents the rollers 6 from moving in the axis-line direction.

The roller 6 is rollable on an outer peripheral surface of a cylindrical rotation driven member 4 rotatably supported via a bearing 8 with respect to the major cylindrical portion 1a of the main housing 1B. A configuration of the outer peripheral surface of the rotation driven member 4 will be explained with reference to FIG. 3 later on. A nut 10 is so fitted to an inner peripheral surface of the rotation driven member 4 as to be impossible of relative rotations by press-fitting or fitting of D-shaped sectional portions to each other, and so on. A screw shaft 11 is inserted through within the nut 10. The screw shaft 11 is formed further extending to an interior of the rotary shaft 3, thereby providing a compact construction in the axis-line direction.

A thread groove 11a (which is partly illustrated) is formed in an outer peripheral surface of a left half portion of the screw shaft 11 as viewed in FIG. 1. On the other hand, a thread groove 10a (which is partly illustrated) is formed, opposite to the thread groove 11a, in an inner peripheral surface of the nut 10. A multiplicity of balls 12 are so disposed as to be rollable in a helical space formed by the thread grooves 10a, 11a. It should be noted that there is provided, though not shown, a path for returning the balls 12 from one end to the other end of the nut 10 when in operation. The nut 10, the screw shaft 11 and the balls 12 build up a ball screw mechanism.

A right half portion of the screw shaft 11 is formed as a round shaft portion 11b as viewed in FIG. 1, and a cylindrical movable case 13 is disposed at a front side end of the round shaft portion 11b. The movable case 13 covering the round shaft portion 11b irrespective of a position of the screw shaft 11 in the axis-line direction, includes a major cylinder 13a, a short minor cylinder 13b disposed coaxially at a right side end of the major cylinder 13a as viewed in FIG. 1, and a flange portion 13c that connects the major cylinder 13a and the minor cylinder 13b to each other. A keyway 13d is formed in an inner peripheral surface of the minor cylinder 13b, and the minor cylinder 13b is so fitted as to be incapable of rotating to a right side end of the screw shaft 11 as viewed in FIG. 1 via a key 14 disposed in this keyway 13d and is further hindered by a stop ring 15 from being removed out of the screw shaft 11. One ends of a pair of wires 16 are connected to an end face of the flange portion 13c, while the other ends of the wires 16 are connected to an unillustrated parking brake apparatus (brake apparatus). The wires 16 move left in FIG. 1 to operate the brake apparatus, thereby giving a braking force to unillustrated traveling wheels. The wires 16 move right in FIG. 1, thereby canceling the braking of the brake apparatus. Note that the wires 16 are invariably biased in the right direction in FIG. 1 by unillustrated springs or the like.

In the movable case 13, a rectilinear groove 13e extending from the left side end in FIG. 1 is formed in an inner peripheral surface of the major cylinder 13a. A pin 17, of which a head portion 17a engages with the rectilinear groove 13e, is embedded in a right side end outer peripheral surface of the minor cylindrical portion 1b of the main housing 1B as viewed in FIG. 1. The movable case 13 is therefore incapable of the relative rotations with respect to the main housing 1B but is relatively movable in the axis-line direction. A partition wall 1c for supporting via a bush 1d the round shaft portion 11b of the screw shaft 11, is formed in a central inner periphery of the minor cylindrical portion 1b of the main housing 1B. A gasket 18 is disposed adjacent (on the right side in FIG. 1) to the partition wall 1c, thereby hermetically sealing between the outer peripheral surface of the round shaft portion 11b and the inner peripheral surface of the minor cylindrical portion 1b. This configuration functions so as to prevent foreign matters from entering.

A power transmission mechanism 50 includes the rotary shaft 3 as a rotation driving portion, the rotation driven member 4 as a rotation driven portion, the outer race 5 as the fixing portion, and the ball screw mechanism (1, 11, 12) as a converting mechanism.

A construction of the power transmission mechanism 50 will be described in depth. In FIG. 3, the rotation driven member 4 has three lines of keyways 4c in this example and three pieces of cam surface 4d in this example, which are formed alternately at equal intervals along an outer peripheral surface thereof. The cam surface 4d takes a configuration of an inclined surface inclined in one direction far apart from an axis of rotation (axial center) as it goes clockwise in FIG. 3.

Let "a" be intervals between the key 7 and the pawl portions 3b provided on both sides of the key 7, "b" be an interval between the roller 6 and the left-sided pawl portion 3b as viewed in FIG. 3 in a state (a second position) where the roller 6 bites in between the outer race 5 and the rotation driven member 4 as indicated by a dotted line in FIG. 3, and "c" be an interval between the roller 6 and the right-sided pawl portion 3b, wherein there is established a relationship such as b>a>c. Note that the pawl portions 3b configure a drive body, and the keys 7 configure restriction members or protruded portions protruding in the radial direction from the rotation driven portion.

Figure 4A:
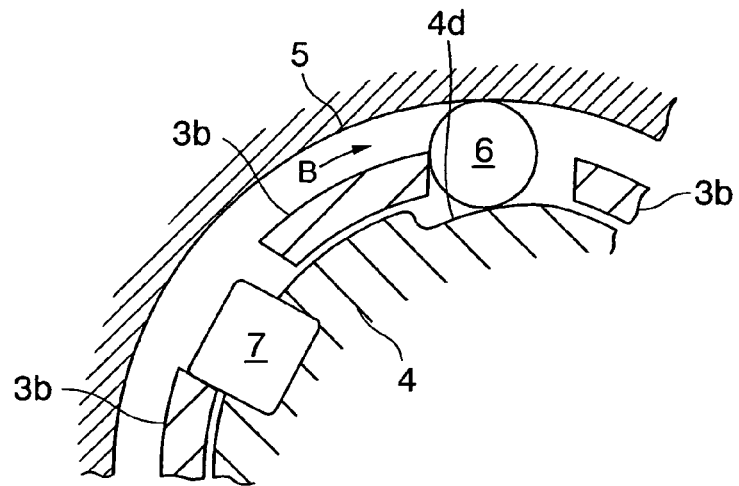
FIGS. 4A, 4B and 4C are views showing an operation of a power transmission mechanism in the first embodiment.
Figure 4B:
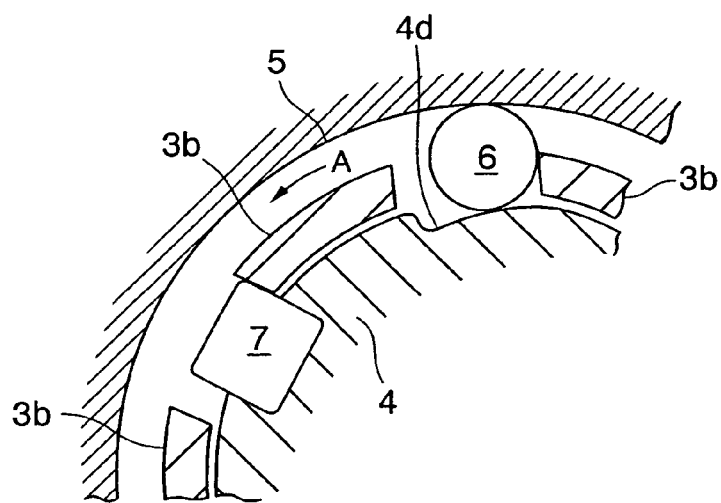
Figure 4C:
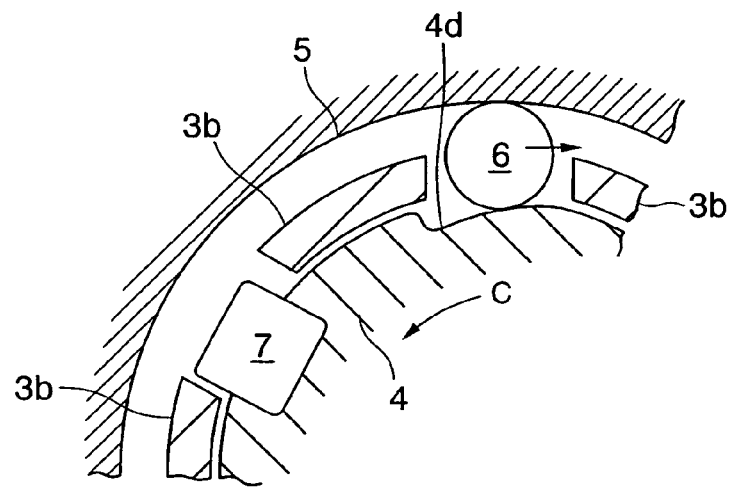

An operation in the present embodiment will be explained with reference to the further-added drawings in FIGS. 4A, 4B and 4C showing an operation of the power transmission mechanism 50. In FIG. 1, when a driver performs a predetermined operation for operating the parking brake, an unillustrated power source supplies the electric motor 2 with electric power, whereby the rotary shaft 3 rotates relatively to the rotation driven member 4. At this time, supposing that the pawl portion 3b rotates in a direction of an arrowhead B in FIG. 4A, an end face of the pawl portion 3b adjacent to the roller 6 tries to abut on the roller 6, however, the interval relationship between the pawl portions 3b, the roller 6 and the key 7 is given by (b>a>c) as described above, and therefore, before moving the roller 6 to the second position (indicated by the dotted line in FIG. 3), the end face of the pawl portion 3b adjacent to the key 7 presses the key 7, whereby the rotary shaft 3 and the rotation driven member 4 rotate integrally. When the nut 10 rotates together with the rotation driven member 4, the screw shaft 11 so supported as to be incapable of rotating with respect to the main housing 1B through the movable case 13, is extruded in the axis-line direction in a low friction state by the balls 12 rolling along the helical space formed by thread grooves 10a, 11a, i.e., a rotational displacement is converted into an axis-line-directional displacement. The movable case 13 moves as the screw shaft 11 moves in the axis-line direction, and hence such motive power is transmitted to the unillustrated brake apparatus via the wires 16, thereby giving the braking force to the unillustrated traveling wheels.

On the other hand, after the electric motor 2 has halted, the biasing force (or a brake reactive force may also be available) generated by the unillustrated spring acts on the wires 16 at all times, so that the axis-line directional displacements of the movable case 13 and the screw shaft 11 which are biased by this biasing force are converted into a rotational displacement of the rotation driven member 4 through the nut 10, with the result that the rotation driven member 4 tries to rotate relatively (in one direction) to the rotary shaft 3. In such a case, the cam surface 4d tries to rotate in a direction of an arrowhead C in FIG. 4C, and hence the roller 6 receives a force from the static outer race 5 and is thereby pressed (biased) toward an upper portion of the cam surface 4d, i.e., toward the side (the second position) far apart from the axial center (axis). The roller 6 is thereby stretched between the outer race 5 and the cam surface 4d, thus giving the frictional force. This is termed a lock state. Such a lock state hinders the rotation of the rotation driven member 4, and hence, even when the biasing force of the wires 16 is comparatively large, the braking force of the unillustrated brake apparatus can be maintained.

Moreover, when the driver performs the predetermined operation for canceling the parking brake in order to start a vehicle, the electric motor 2 is supplied with the electric power assuming a reverse polarity from the unillustrated power source, whereby the rotary shaft 3 rotates relatively to the rotation driven member 4. At this time, when the pawl portion 3b rotates in an arrowhead-A direction in FIG. 4B, the end face of the pawl portion 3b adjacent to the key 7 abuts on the key 7, and the rotation driven member 4 is rotated in the same direction. Further, the end face of the pawl portion 3b adjacent to the roller 6 presses the roller 6 toward a lower portion of the cam surface 4d, i.e., toward the side (the first position) close to the axial center (axis), and hence it follows that the rotary shaft 3 and the rotation driven member 4 rotate integrally without any occurrence of bite-in of the roller 6.

Figure 5:
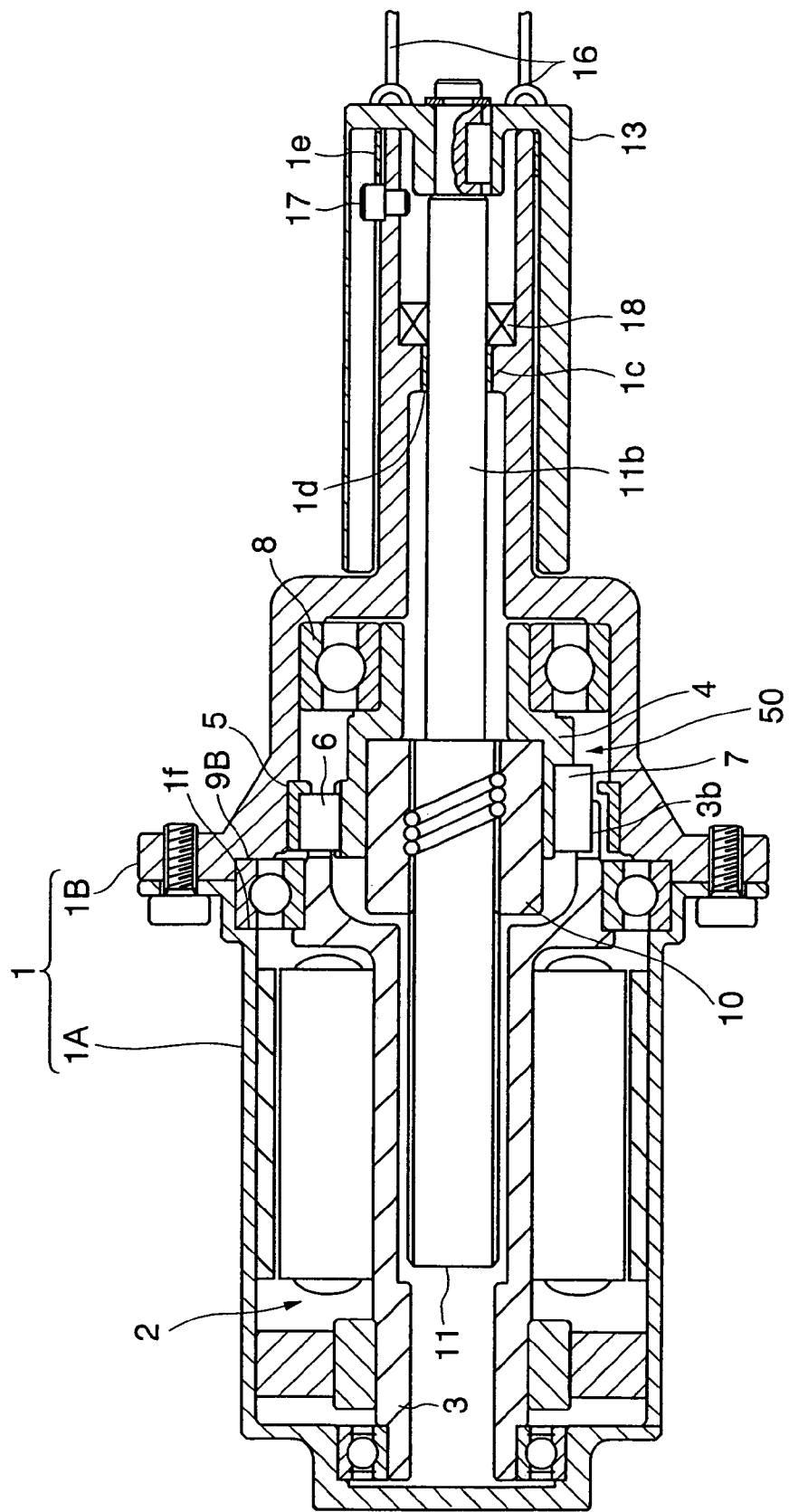
FIG. 5 is a sectional view of the electric parking brake drive apparatus in a second embodiment.

FIG. 5 is a sectional view of the electric parking brake drive apparatus according to a second embodiment. As illustrated in FIG. 5, the electric parking brake drive apparatus according to the second embodiment is just different in terms of housing structure and a movable case support structure, and therefore the common main components are marked with the same reference numerals, of which the explanations are omitted.

In FIG. 5, a bush 1e is disposed on an outer peripheral surface, at the right side end in FIG. 1, of the minor cylindrical portion 1b of the main housing 1B, and the inner peripheral surface of the movable case 13 is supported by the bush 1e. Then, a bush 1d disposed on the partition wall 1c supports the outer peripheral surface of the round shaft portion 11b of the screw shaft 11, whereby a stable movement of the movable case 13 can be ensured.

Note that a fitting portion to a bearing 9B in the motor housing 1A of the housing 1 is formed as a stepped portion 1f. With this contrivance, the bearing 9B can be prevented from moving in the axis-line direction along the inner peripheral surface of the motor housing 1A.

Moreover, according to the second embodiment, even if the housing 1 abuts on the movable case 13 or the screw shaft 11 at a movable end of the screw shaft 11, the relative rotations between the components abutting on each other are restrained, and it is therefore possible to restrain inconveniences such as [bite-in], [galling], etc., which are easy to occur when, for instance, a rotary body butts against a static body. Even if the relative rotations between the housing 1 and the movable case 13 or the screw shaft 11 are restrained, however, these components butt against each other, which might cause butting noises and impressions. These inconveniences can be avoided according to an embodiment that follows.

Figure 6:
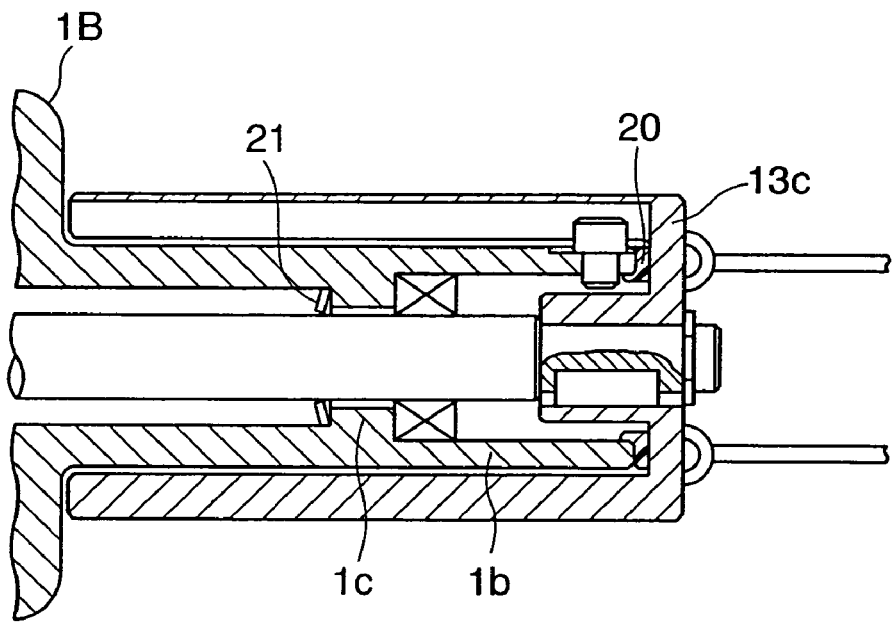
FIG. 6 is a partial sectional view of the electric parking brake drive apparatus in a third embodiment.

FIG. 6 is a sectional view of the electric parking brake drive apparatus according to a third embodiment. As shown in FIG. 6, the electric parking brake drive apparatus according to the third embodiment is just different in terms of providing a buffer member, and therefore the explanations of the common points other than the above-mentioned are omitted.

According to the third embodiment, as illustrated in FIG. 6, a disc-like buffer member 20 formed of a rubber material is disposed at a front side end of the minor cylindrical portion 1b of the main housing 1B. Further, a bugger member (plate spring) 21 is disposed adjacent to the partition wall 1c. As shown in FIG. 6, it is preferable that the buffer member 20 be protruded on its inner peripheral side in the axis-line direction so as to be inserted into the front side end of the minor cylindrical portion 1b. When in operation of the brake apparatus, as illustrated in FIG. 6, the flange portion 13c of the movable case 13 might butt against the end face of the minor cylindrical portion 1b. In such a case, however, according to the third embodiment, the buffer member 20 can buffer the butting between these two components, whereby emission of the butting noises, etc can be restrained. On the other hand, when in cancellation of the brake apparatus, referring to FIG. 2, the side end portion of the thread groove 11a of the screw shaft 11 might butt against the partition wall 1c of the minor cylindrical portion 1b. In such a case, however, the buffer member 21 buffers the butting between these two components, whereby the emission of the butting noises, etc can be restrained.

Figure 7:
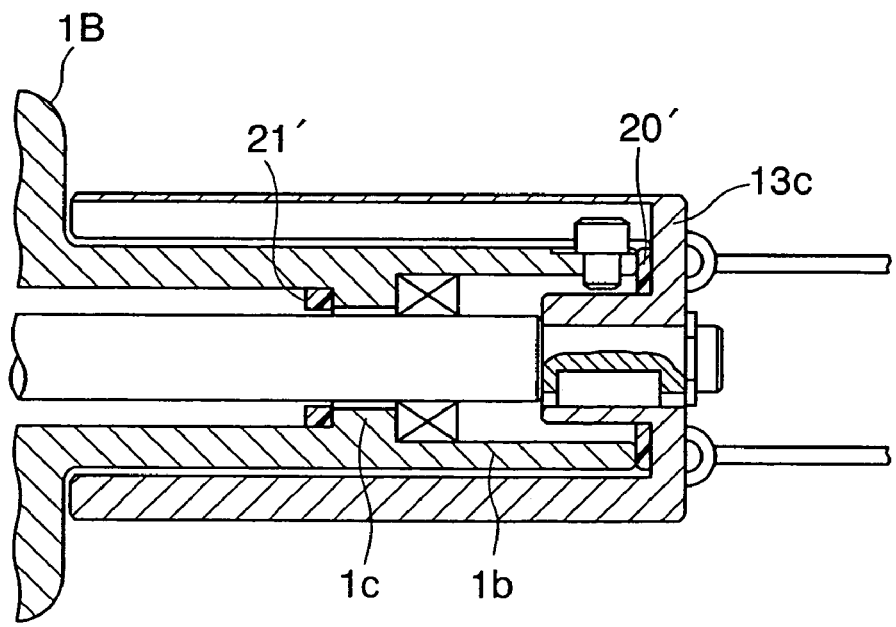
FIG. 7 is a partial sectional view of the electric parking brake drive apparatus in a fourth embodiment.

FIG. 7 is a sectional view of the electric parking brake drive apparatus according to a fourth embodiment. The fourth embodiment is different from the electric parking brake drive apparatus according to the third embodiment in FIG. 6 in terms of providing a buffer member 20' composed of a plate spring as a substitute for the rubber-based buffer member 20 and also providing a rubber-based buffer member 21' in place of the plate spring 21, and therefore the explanations of the common points other than the above-mentioned are omitted.

Figure 8:
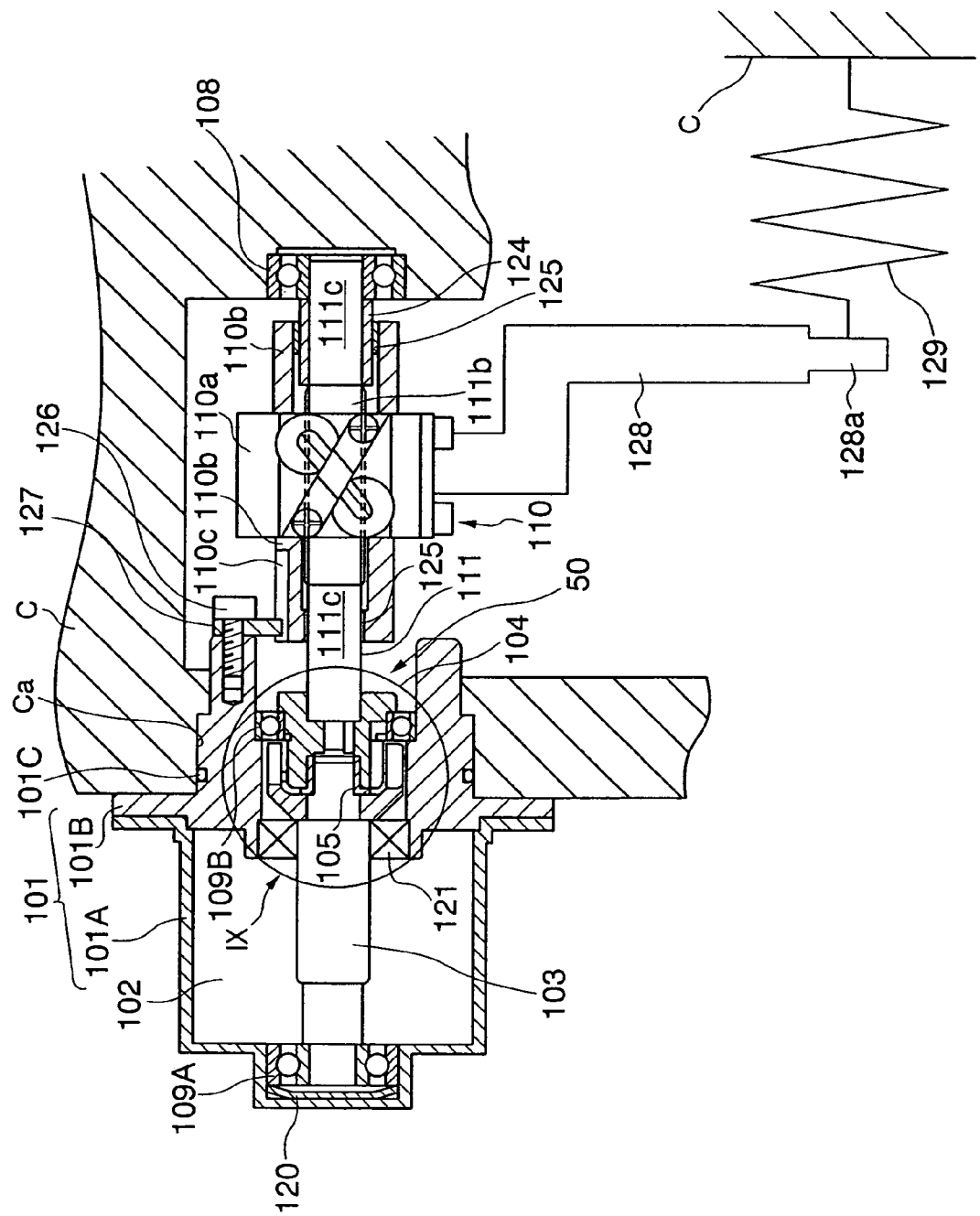
FIG. 8 is a sectional view of a linear actuator in a fifth embodiment.
Figure 9:
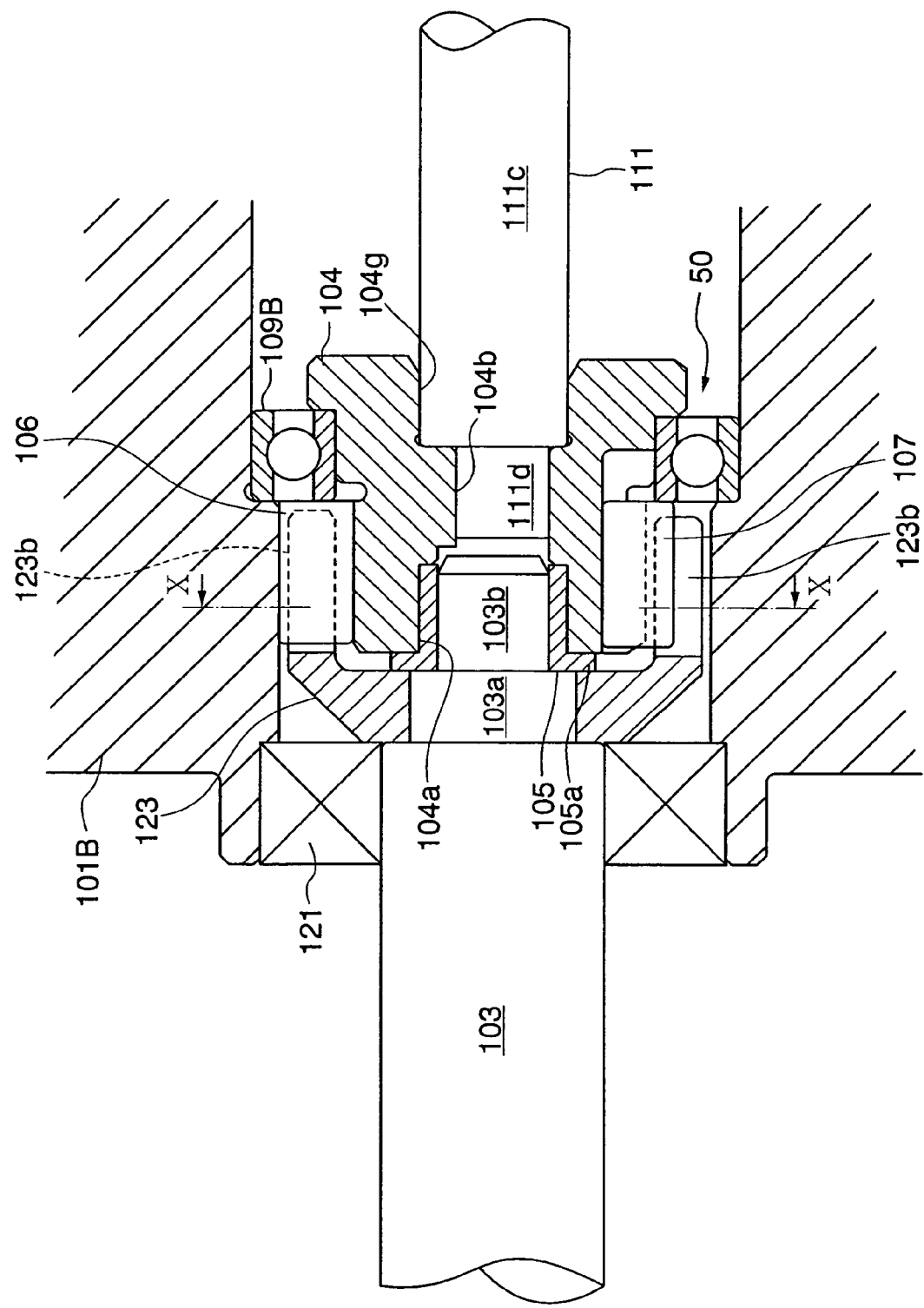
FIG. 9 is an enlarged view of a portion indicated by an arrowhead IX in the construction in FIG. 8.
Figure 10:
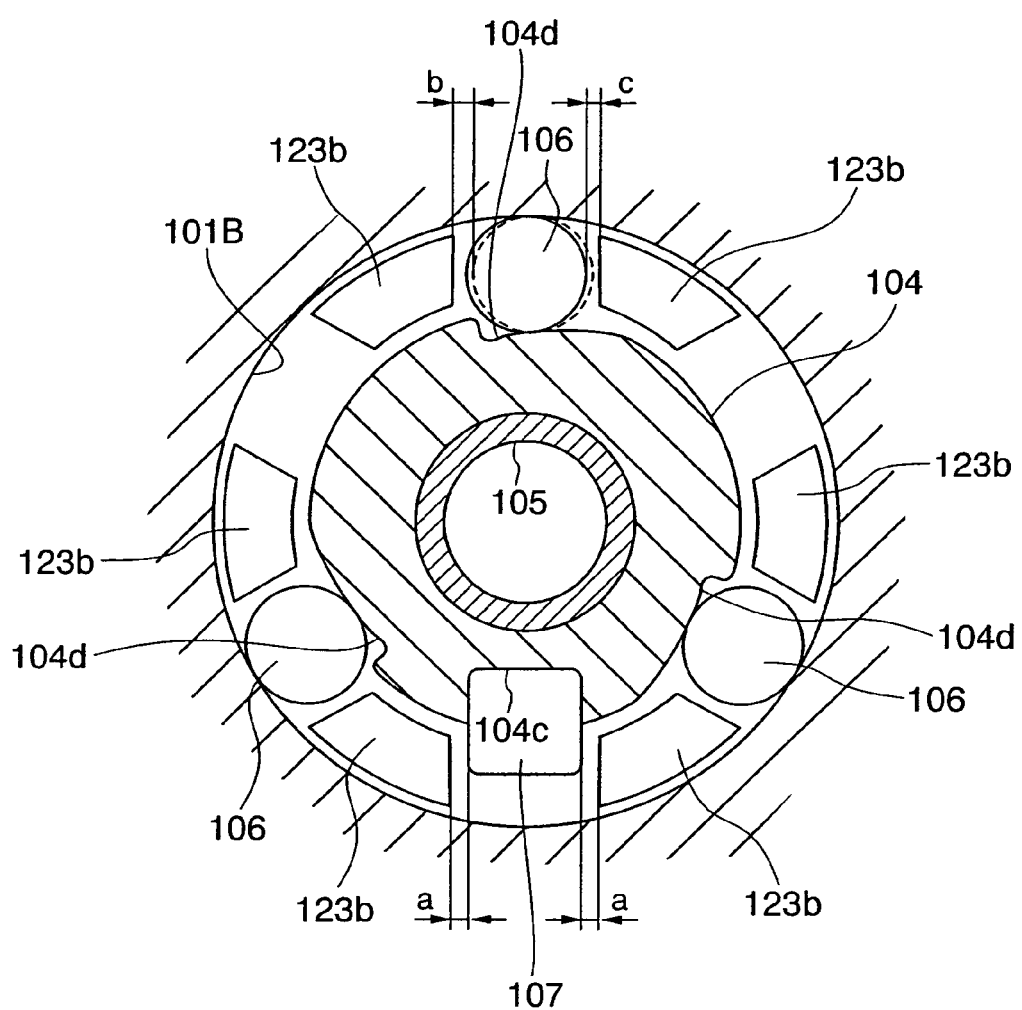
FIG. 10 is a view showing a construction cut off along the line X-X in FIG. 9 as viewed in an arrowhead direction.

FIG. 8 is a sectional view of a linear actuator according to a fifth embodiment. FIG. 9 is an enlarged view of a portion indicated by an arrowhead IX in the construction in FIG. 8. FIG. 10 is a view of the construction as viewed in an arrowhead direction in a way that cuts off the construction along the line X-X.

In FIG. 8, main housing 101B taking a substantially cylindrical shape is fitted via an O-ring 101C in an aperture Ca of a box body C and is thus secured to the box body C together with cylindrical motor housing 101A by use of an unillustrated bolt. Housing 101 is constructed of the motor housing 101A and the main housing 101B. An electric motor 102 including a rotary shaft 103 defined as an output shaft is disposed inwardly of the motor housing 101A.

The rotary shaft 103 is rotatably supported via a bearing 109A with respect to the motor housing 101A at a left side end in FIG. 8. The bearing 109A is biased by a washer spring 120 toward a right side in FIG. 8 against the motor housing 101A. Note that an outer peripheral surface of the rotary shaft 103 is hermetically sealed by a seal 121 with respect to the main housing 101B.

A right side end, as viewed in FIG. 9, of the rotary shaft 103 is formed with a first diameter-reduced portion 103a and a second diameter-reduced portion 103b that is smaller in its diameter than the first diameter-reduced portion 103a. A pawl member 123 is so fitted to the first diameter-reduced portion 103a as to be incapable of relative rotations by press-fitting or parallel double-face-width fitting, and so on. The pawl member 123 includes six pieces of pawl portions 123b extending in the axis-line direction outwardly in the radial direction of the second diameter-reduced portion 103b (see FIG. 10).

As shown in FIG. 10, three pieces of rollers 106 and a single key 107 are so disposed at equal intervals in a peripheral direction as to be pinched by a pair of pawl portions 123b inwardly in the radial direction of the main housing 101B. The roller 106 is hindered from moving in the axis-line direction by a bearing 109B for rotatably supporting a rotation driven member 104 with respect to the main housing 101B (see FIG. 9).

Further, in FIG. 9, the roller 106 is rollable on an outer peripheral surface of the rotatably-supported rotation driven member 104 taking a substantially cylindrical shape. A configuration of the outer peripheral surface of the rotation driven member 104 will be described referring to FIG. 10 later on. The hollowed rotation driven member 104 has three pieces of inside diameter fitting surfaces (a first fitting surface 104a, a second fitting surface 104b and a third fitting surface 104c). A cage 105 is fitted in between the first fitting surface 104a on the side of the rotary shaft 103 and the second diameter-reduced portion 103b of the rotary shaft 103, wherein relative rotations therebetween are allowed.

The cylindrical cage 105 has a collar portion 105a. This collar portion 105 receives a thrust load between the rotation driven member 104 and the rotary shaft 103.

The second fitting surface 104b of the rotation driven member 104 is so fitted to a diameter-reduced portion 111d formed at a left side end, as viewed in the Figure, of a screw shaft 111 as to be incapable of relative rotations by press-fitting or mutual fitting of D-shaped sectional portions, and so forth. An outer peripheral surface of a side end portion of a round shaft portion 111c of the screw shaft 111 is spigot-fitted to a third fitting surface 104g. Namely, the rotary shaft 103 and the screw shaft 111 are coaxially connected to each other through the bush 105 and the rotation driven member 104 in such a form that their side end portions butt against each other.

In FIG. 8, a central portion of the screw shaft 111 is formed as a thread portion 111b formed with a thread groove, and round shaft portions 111c are formed on both sides thereof. A right side end, as viewed in FIG. 8, of the right-sided round shaft portion 111c is rotatably supported via a bearing 108 with respect to the box body C. A cylindrical spacer 124 is disposed on an outer periphery of the right-sided round shaft portion 111c and is pinched in between an inner race of the bearing 108 and the thread portion 111b. A biasing force of the washer spring 120 is transmitted to the bearing 108 via the bearing 109A, the rotary shaft 103, the bush 105, the rotation driven member 104, the screw shaft 111 and the spacer 124, thereby positioning the respective portions with respect to the box body C and generating pre-loads of the bearings 109A, 108. It should be noted that when in operation, the bearing 109B is burdened with a moment force generated on the screw shaft 111 and a thrust load acting on the left side in FIG. 8, while the bearing 108 is burdened with a thrust load, acting on the right side in FIG. 8, of the screw shaft 111.

The screw shaft 111 penetrates a nut 110. The nut 110 includes a central nut portion 110a and cylindrical guide portions 110b joined to the nut portion 110a on the both sides in the axis-line direction thereof. An inner peripheral surface of the hollowed nut portion 110a is formed with an unillustrated thread groove, and a multiplicity of balls (not shown) are so disposed as to be rollable in a helical space formed by the thread grooves of the nut portion 110a and of the screw shaft 111. Note that there is provided, though not shown, a path for returning the balls from one end to the other end of the nut portion 110a when in operation. The nut 110, the screw shaft 111 and the unillustrated balls build up a ball screw mechanism.

Bushes 125 are disposed respectively between the pair of guide portions 110b of the nut 110 and the round shaft portion 111c of the screw shaft 111 that faces these guide portions 110b. The left-sided guide portion 110 in FIG. 8 is formed with a rectilinear groove 10c. The other side end of an engaging member 127 of which one end is attached to the main housing 101B by use of a bolt 126, engages with this rectilinear groove 110c. The engaging member 127 is constructed to inhibit the relative rotation of the nut 110 to the main housing 101B but to permit a relative movement in the axis-line direction thereof.

One side end of a crank-like driven member 128 is fitted to an external portion of the nut 110, wherein the driven member 128 extends in the radial direction. A spring 129 representing a load for the explanation's sake is fitted to a drive end 128a as the other side end thereof, and always biases the drive end 128a toward the left in FIG. 8 against the box body C. Namely, it follows that a clockwise moment force acts on the nut 110. Incidentally, it is assumed that an interior of the box body C be filled with an oil or grease.

The power transmission mechanism 50, according to the fifth embodiment, includes the rotary shaft 103 defined as the rotation driving portion, the rotation driven member 104 as the rotation driven portion, the main housing 101B as a retainer, and the ball screw mechanism (110, 111) as a converting mechanism.

A detailed construction of the power transmission mechanism 50 will be described. In FIG. 10, an outer peripheral surface of the rotation driven member 104 is formed with a single keyway 104c and three pieces cam surfaces 104d that are disposed at equal intervals in this example. The cam surface 104d takes a configuration of an inclined surface inclined in one direction far apart from an axis of rotation (axial center) as it goes clockwise in FIG. 10.

Let "a" be intervals between the key 107 and the pawl portions 123b provided on both sides of the key 7, "b" be an interval between the roller 106 and the left-sided pawl portion 123b as viewed in FIG. 10 in a state (a second position) where the roller 6 bites in between the main housing 101B and the rotation driven member 104 as indicated by a dotted line in FIG. 10, and "c" be an interval between the roller 106 and the right-sided pawl portion 123b, wherein there is established a relationship such as b>a>c.

An operation in the present embodiment will be explained. In FIG. 8, when the unillustrated power source supplies the electric motor 2 with the electric power, the rotary shaft 103 rotates relatively to the rotation driven member 104. At this time, supposing that the pawl portion 123b rotates clockwise in FIG. 10, an end face of the pawl portion 123b adjacent to the roller 106 tries to abut on the roller 106, however, the interval relationship between the pawl portions 123b, the roller 106 and the key 107 is given by (b>a>c) as described above, and therefore, before moving the roller 106 to the second position (indicated by a dotted line in FIG. 10), the end face of the pawl portion 123b adjacent to the key 107 presses the key 107, whereby the rotary shaft 103 and the rotation driven member 104 rotate integrally. On this occasion, the roller 106 rolls on the inner peripheral surface of the main housing 101B, which contributes to restraining a rotational resistance. The screw shaft 111 rotates together with the rotation driven member 104, however, the nut 110 is so engaged (locked) by the engaging member 127 as not to rotate and consequently moves in the axis-line direction. Namely, a rotational displacement of the screw shaft 111 is converted into an axis-line-directional displacement of the nut 110. As the nut 110 moves in the axis-line direction, the driven member 128 moves in the axis-line direction, wherein a predetermined drive is conducted.

On the other hand, after the electric motor 102 has halted, the spring 129 applies its biasing force to the driven member 128 at all times, so that the axis-line directional displacement of the nut 110 biased by this biasing force is converted into the rotational displacement of the rotation driven member 104 through the screw shaft 111, with the result that the rotation driven member 104 tries to rotate relatively (in one direction) to the rotary shaft 103. In such a case, the cam surface 104d tries to rotate counterclockwise, and hence the roller 106 receives a force from the static main housing 101B and is thereby pressed (biased) toward an upper portion of the cam surface 104d, i.e., toward the side (the second position) far apart from the axial center (axis). The roller 106 is thereby stretched between the main housing 101B and the cam surface 104d, thus giving the frictional force. This is termed a lock state. Such a lock state hinders the rotation of the rotation driven member 104, and hence, even when the biasing force of the spring 129 is comparatively large, the position of the driven member 128 can be maintained.

Moreover, when the electric motor 2 is supplied with the electric power assuming a reverse polarity from the unillustrated power source, the rotary shaft 103 rotates in a direction reversed to the above-mentioned with respect to the rotation driven member 104. Then, the end face of the pawl portion 123$b$ adjacent to the key 107 abuts on the key 107, and the rotation driven member 104 is rotated in the same direction. At this time, the end face of the pawl portion 123$b$ adjacent to the roller 106 presses the roller 106 toward a lower portion of the cam surface 104$d$, i.e., toward the side (the first position) close to the axial center (axis), and hence it follows that the rotary shaft 103 and the rotation driven member 104 rotate integrally without any occurrence of bite-in of the roller 106.

According to the fifth embodiment, the drive end 128$a$ of the driven member 128 biased by the spring 129 is in the position that is offset from the nut 110, and therefore the nut 110 receives the moment force. While on the other hand, the nut portion 110$a$ formed with the thread groove is so supported through the bush 125 by the pair of guide portions 110$b$ for pinching the nut portion 110$a$ in the axis-line direction as to be incapable of the relative rotation with respect to the round shaft portion 11$c$ of the screw shaft 111, and consequently the moment force applied to the nut 110 prevents a change in the interval between the nut portion 110$a$ and the thread portion 111$b$ of the screw shaft 111. Accordingly, smooth rolling of the unillustrated balls can be ensured, whereby a malfunction does not occur.

As described above, according to the fifth embodiment, the nut 110 is moved in the axis-line direction with respect to the screw shaft 111, thereby making it possible to provide the construction that operates the driven member within the box body C. This construction can be applied to, e.g., an automatic clutch release mechanism and to a 2-wheel-drive/4-wheel-drive changeover apparatus in a 4-wheel drive mechanism.

Figure 11:
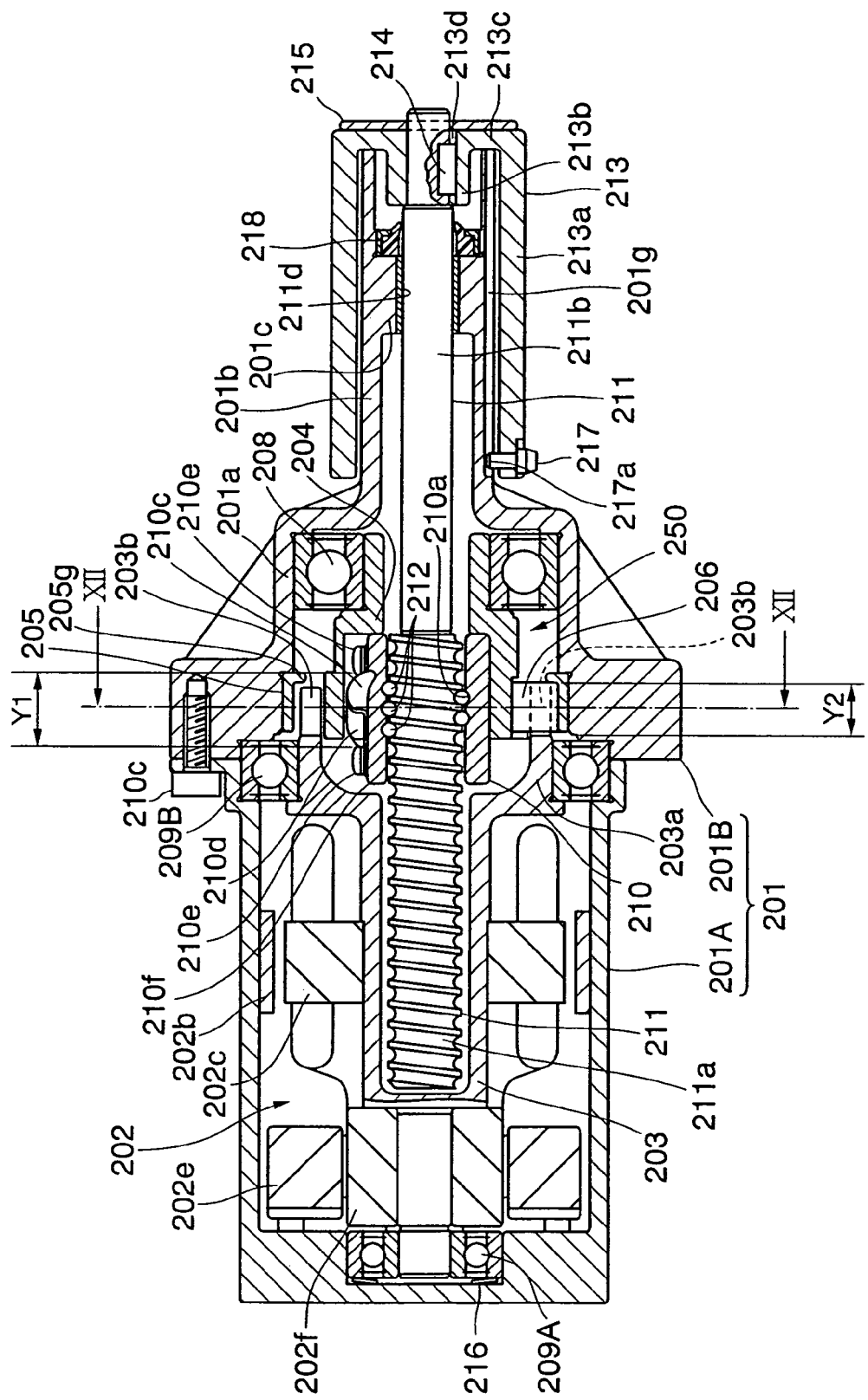
FIG. 11 is a sectional view of the linear actuator in a sixth embodiment.
Figure 12:
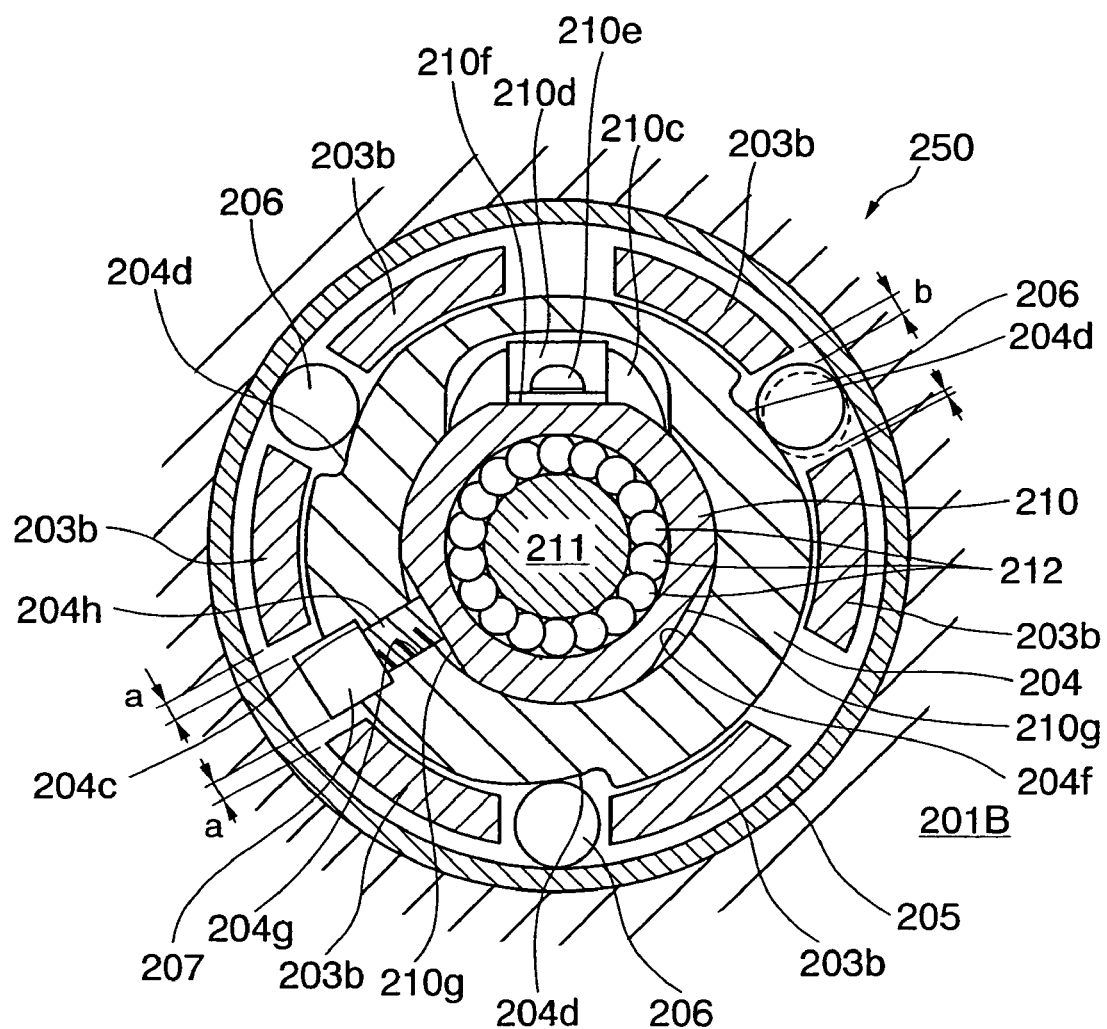
FIG. 12 is a view showing a construction cut off along the line XII-XII in FIG. 11 as viewed in an arrowhead direction.

Next, a sixth embodiment will be described with reference to the drawings. FIG. 11 is a sectional view of the linear actuator exemplified by way of the sixth embodiment. FIG. 12 is a view of a construction in FIG. 11 that is cut off along the line XII-XII as viewed in an arrowhead-pointed direction.

In FIG. 11, cylindrical motor housing 201 and a cylindrical main housing 201B are connected to each other via a bolt 201C. A fixed case 201 serving as housing is constructed of the motor housing 201A and the main housing 201B.

A cylindrical stator 202$b$ is fixed to an inner peripheral surface of the motor housing 201A, and embraces a rotor 202$c$. The rotor 202C is attached to an outer peripheral surface of a rotary shaft 203 rotatably supported via bearings 209A and 209B with respect to the motor housing 201A, whereby the rotary shaft 203 and the rotor 202$c$ rotate together. A commutator 202$f$ is disposed on an outer periphery of the rotary shaft 203 adjacently to the rotor 202$c$, and a brush 202$e$ is slidably contiguous to this outer peripheral surface thereof. An electric motor 202 has the stator 202$b$, the rotor 202$c$, the brush 202$e$, the commutator 202$f$ and the rotary shaft 203. Note that an outer race of the bearing 209A is pressed by a spring 216 in the axis-line direction against the motor housing 201A, Accordingly, after being assembled, preloads are applied to the bearings 209A, 209B.

The rotary shaft 203 is hollowed and is formed with, at a right side end in FIG. 11, a large-diameter portion 203$a$ rotatably supported via a bearing 209B with respect to the motor housing 201A, and a plurality of pawl portions 203$b$ (six pieces are provided in this example) protruding from the large-diameter portion 203$a$ in an axis-line direction. Note that an outer race of the bearing 209B is fitted to both of the inner peripheral surface of the motor housing 201A and the inner peripheral surface of the main housing 201B, whereby the main housing 201B and the electric motor 202 are aligned with each other. This contrivance that the outer race of the bearing 209B is fitted to the inner peripheral surface of the motor housing 201A and to the inner peripheral surface of the main housing 201B, is convenient to handle, for instance, in the case of assembling and making an inspection because of the rotary shaft 203 being supported on the two bearings 209A and 209B even when the main housing 201B is separated from the motor housing 201A.

The main housing 201B takes such a configuration as to connect a major cylindrical portion 201$a$ and a minor cylindrical portion 201$b$ to each other. An outer race 205 defined as a fixing portion is fitted to an inner peripheral surface of the major cylindrical portion 201$a$. As lock members, rollers 206 (three pieces are provided in this example) are so disposed as to be pinched between the adjacent pawl portions 203$b$ inwardly in the radial direction of the outer race 205, and a key 207 (one piece is provided in this example) is so disposed as to be pinched in a roller 206 non-existing space between the pawl portions 203$b$. The outer race 205 has a flange portion 205$g$ protruding inwards in the radial direction at a right side end in FIG. 11, and this flange portion 205$g$ prevents the rollers 206 from moving in the axis-line direction.

The roller 206 is rollable on an outer peripheral surface of a cylindrical rotation driven member 204 rotatably supported via a bearing 208 with respect to the major cylindrical portion 201$a$ of the main housing 201B. A configuration of the outer peripheral surface of the rotation driven member 204 will be explained with reference to FIG. 13 later on. A nut 210 is so fitted by a headless bolt 204$h$ that will hereinafter be described to an inner peripheral surface of the rotation driven member 204 as to be impossible of relative rotations. A screw shaft 211 is inserted through within the nut 210. The screw shaft 211 is formed further extending to an interior of the rotary shaft 203 (i.e., extending to the inside, in the radial direction, of a coil or a magnet of the electric motor 202), thereby providing a compact construction in the axis-line direction. Note that the nut 210 may also be provided inwardly in the radial direction of the coil or the magnet of the electric motor 202.

A thread groove 211$a$ is formed in an outer peripheral surface of a left half portion of the screw shaft 211 as viewed in FIG. 11. On the other hand, a thread groove 210$a$ (which is partly illustrated) is formed, opposite to the thread groove 211$a$, in an inner peripheral surface of the nut 210. A multiplicity of balls 212 are so disposed as to be rollable in a helical space (transfer path) formed by the thread grooves 210$a$, 211$a$. It should be noted that the nut 210, the screw shaft 211 and the balls 212 build up a ball screw mechanism.

A right half portion of the screw shaft 211 is formed as a round shaft portion 211$b$ as viewed in FIG. 11, and a cylindrical movable case 213 is disposed at a front side end of the round shaft portion 211$b$. The movable case 213 covering the round shaft portion 211$b$ irrespective of a position of the screw shaft 211 in the axis-line direction, includes a major cylinder 213$a$, a short minor cylinder 213$b$ disposed coaxially at a right side end of the major cylinder 213a as viewed in FIG. 11, and a flange portion 213c that connects the major cylinder 213a and the minor cylinder 213b to each other. A keyway 213d is formed in an inner peripheral surface of the minor cylinder 213b, and the minor cylinder 213b is so fitted as to be incapable of rotating to a right side end of the screw shaft 211 as viewed in FIG. 11 via a key 214 disposed in this keyway 213d and is further hindered by a stop ring 215 from being removed out of the screw shaft 211. One end of an unillustrated wire is connected to an end face of the flange portion 213c, while the other end of the wire is connected to an unillustrated parking brake apparatus (brake apparatus). This wire constituting a driven member moves left in FIG. 11 to operate the brake apparatus, thereby giving a braking force to unillustrated traveling wheels. The wire moves right in FIG. 11, thereby canceling the braking of the brake apparatus. Note that the wire is invariably biased in the right direction in FIG. 11 by an unillustrated spring or the like.

A pin 217 is embedded in the vicinity of a left side end of the movable case 213 in FIG. 11. A tip 217a of the pin 217, which protrudes inward in the radial direction from the movable case 213, engages with a rectilinear groove 201g formed in the main housing 201B so as to be relatively movable. The movable case 213 is therefore incapable of the relative rotations with respect to the main housing 201B but is relatively movable in the axis-line direction. A partition wall 201c for supporting via a bush 211d the round shaft portion 211b of the screw shaft 211, is formed in a central inner periphery of the minor cylindrical portion 201b of the main housing 201B. A gasket 218 is disposed adjacent (on the right side in FIG. 11) to the partition wall 201c, thereby hermetically sealing between the outer peripheral surface of the round shaft portion 211b and the inner peripheral surface of the minor cylindrical portion 201b. This configuration functions so as to prevent foreign matters from entering.

In the sixth embodiment, when at least part (the pawl portion 203b within a range Y2 in FIG. 11) of the axis-directional engagement portion between the rotary shaft 201 as the rotation driving portion and the rotation driven member 204 as the rotation driven portion exists in a range (an axis-line-directional extension range Y1 of a tube 210c in FIG. 11) where the ball 212 of the ball screw mechanism (212, 210, 211) exits, it is possible to restrain an adverse effect that is exerted on the nut 210 by the moment generated at the engagement portion (the pawl portion 203b) due to an axis deviation between the electric motor 202 and the nut 210.

A power transmission mechanism 250 includes the rotary shaft 203 as the rotation driving portion, the rotation driven member 204 as the rotation driven portion, the outer race 205 as the fixing portion, and the ball screw mechanism (211, 210, 211) as a converting mechanism.

A construction of the power transmission mechanism 250 will be described in detail. In FIG. 12, the rotation driven member 204 is formed with three pieces of cam surface 204d in this example, which are provided at equal intervals along an outer peripheral surface thereof, and with a single keyway 204c between the pair of cam surfaces 204d. The cam surface 204d takes a configuration of an inclined surface inclined in one direction far apart from an axis of rotation (axial center) as it goes clockwise in FIG. 12.

Let "a" be intervals between the key 207 and the pawl portions 203b provided on both sides of the key 7, "b" be an interval between the roller 206 and the left-sided pawl portion 203b as viewed in FIG. 12 in a state (a second position) where the roller 206 bites in between the outer race 205 and the rotation driven member 204 as indicated by a dotted line in FIG. 12, and "c" be an interval between the roller 206 and the right-sided pawl portion 203b, wherein there is established a relationship such as b>a>c.

In FIG. 12, the tube 210c is fixed by a press member 210d. The press member 210d is secured to a flat surface 210f formed on an outer periphery of the nut 210 by use of two pieces of screws 210e. The tube 210c, the press member 210d and the two screws 210e are accommodated in a thin semicylindrical space formed between a cylindrical inner peripheral surface 204f of the rotation driven member 204 and the flat surface 210f of the nut 210.

Two pieces of balance flat surfaces 210g, 210g are formed on the side opposite to the outer peripheral surface where the tube 210c is disposed, with the axis line of the nut 210 being interposed therebetween. The balance flat surfaces 210g, 210g, which configure a balancing cut portion, have a function of moderating unbalance caused by forming the flat surface 210f for attaching the tube 210c and forming a space for attaching the tube 210c. It is therefore desirable that the balance flat surfaces 210g, 210g be cut by a balancing quantity after the tube 210c, etc. has been attached. Further, a relative rotation between the rotation driven member 204 and the nut 210 is restrained by abutting, on the balance flat surface 210g, the headless bolt 204h screwed in a thread hole 204g formed in the rotation driven member 204. Note that one single balance flat surface 210g may also be formed in parallel with the flat surface 210f.

Figure 13A:
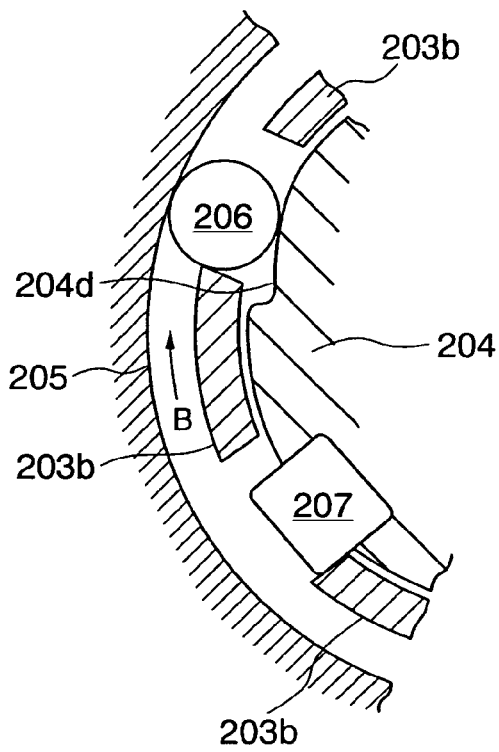
FIGS. 13A, 13B and 13C are views showing an operation of the power transmission mechanism in the sixth embodiment.
Figure 13B:
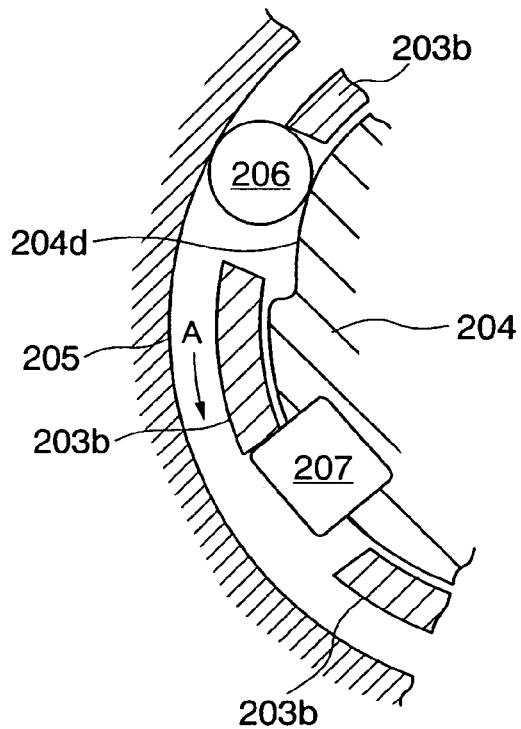
Figure 13C:
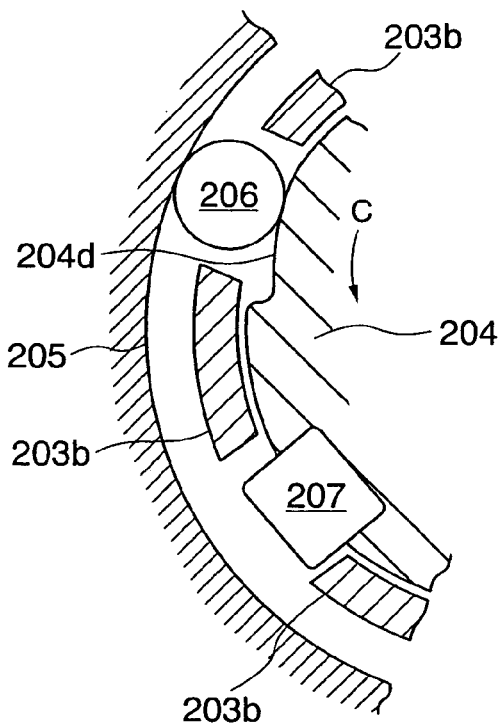

An operation in the sixth embodiment will be explained with reference to the further-added drawings in FIGS. 13A, 1B and 13C showing an operation of the power transmission mechanism 250. When the driver performs the predetermined operation for operating the parking brake, in FIG. 11, the unillustrated power source supplies the electric motor 202 with the electric power, whereby the rotary shaft 203 rotates relatively to the rotation driven member 204. At this time, supposing that the pawl portion 203b rotates in a direction of an arrowhead B in FIG. 13A, an end face of the pawl portion 203b adjacent to the roller 206 tries to abut on the roller 206, however, the interval relationship between the pawl portions 203b, the roller 206 and the key 207 is given by (b>a>c) as described above, and therefore, before moving the roller 206 to the second position (indicated by the dotted line in FIG. 12), the end face of the pawl portion 203b adjacent to the key 207 presses the key 207, whereby the rotary shaft 203 and the rotation driven member 204 rotate integrally. When the nut 210 rotates together with the rotation driven member 204, the screw shaft 211 so supported as to be incapable of rotating with respect to the main housing 201B through the movable case 213, is extruded in the axis-line direction in a low friction state by the balls 212 rolling along the helical space (the transfer path) formed by thread grooves 210a, 211a, i.e., a rotational displacement is converted into an axis-line-directional displacement. The movable case 213 moves as the screw shaft 211 moves in the axis-line direction, and hence such motive power is transmitted to the unillustrated brake apparatus via the wire (not shown), thereby giving the braking force to the unillustrated traveling wheels. It is to be noted that the ball 212 having being transferred along the transfer path and having reached one end thereof, is returned to the other end of transfer path via a circulation path within the tube 210c.

On the other hand, after the electric motor 202 has halted, the biasing force (or a brake reactive force may also be available) generated by the unillustrated spring acts on the wire at all times, so that the axis-line directional displacements of the movable case 213 and the screw shaft 211 which are biased by this biasing force are converted into a rotational displacement of the rotation driven member 204 through the nut 210, with the result that the rotation driven member 204 tries to rotate relatively to the rotary shaft 203. In such a case, the cam surface 204*d* tries to rotate in a direction of an arrowhead C in FIG. 13C, and hence the roller 206 receives a force from the static outer race 205 and is thereby pressed (biased) toward an upper portion of the cam surface 204*d*, i.e., toward the side (the second position) far apart from the axial center (axis). The roller 206 is thereby stretched between the outer race 205 and the cam surface 204*d*, thus giving the frictional force. This is termed a lock state. Such a lock state hinders the rotation of the rotation driven member 204, and hence, even when the biasing force of the wire is comparatively large, the braking force of the unillustrated brake apparatus can be maintained.

Moreover, when the driver performs the predetermined operation for canceling the parking brake in order to start the vehicle, the electric motor 202 is supplied with the electric power assuming a reverse polarity from the unillustrated power source, whereby the rotary shaft 203 rotates relatively to the rotation driven member 204. At this time, when the pawl portion 203*b* rotates in an arrowhead-A direction in FIG. 13B, the end face of the pawl portion 203*b* adjacent to the key 207 abuts on the key 207, and the rotation driven member 204 is rotated in the same direction. Further, the end face of the pawl portion 203*b* adjacent to the roller 206 presses the roller 206 toward a lower portion of the cam surface 204*d*, i.e., toward the side (the first position) close to the axis of rotation, and hence it follows that the rotary shaft 203 and the rotation driven member 204 rotate integrally without any occurrence of bite-in of the roller 206.

According to the sixth embodiment, the balance flat surface 210*g* configuring the balancing cut portion moderates the unbalance caused by forming the flat surface 210*f*, etc. for attaching the tube 210*c*. Therefore, even when the rotation driven member 204 and the nut 210 rotate at a high speed, shake-around or the like does not occur, thereby enabling a smooth operation to be provided. Besides, because of obviating or moderating the unbalance, there is no necessity of providing the member exceeding the outside diameter of the nut 210 as in the prior art. It is therefore sufficient that the rotation driven member 204 embracing the nut 210 is formed with the cylindrical inner peripheral surface 204*f* substantially equal to the outside diameter of the nut 210, thereby facilitating manufacturing.

Figure 14:
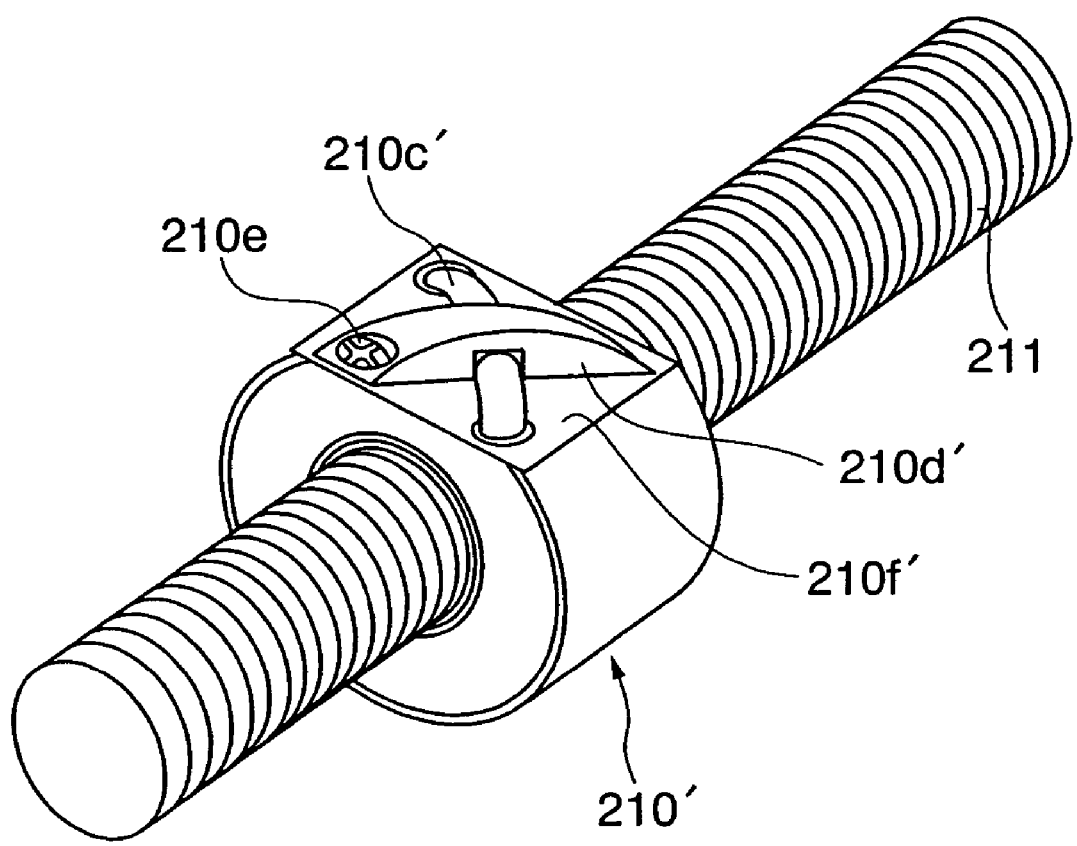
FIG. 14 is a perspective view of a ball screw mechanism used for the linear actuator in a seventh embodiment.

FIG. 14 is a perspective view of a ball screw mechanism involving the use of the linear actuator according to a seventh embodiment. Such a ball screw mechanism can be applied as it is to the linear actuator shown in FIG. 11.

In FIG. 14, a nut 210' is, unlike the embodiment discussed above, not provided with the balancing cut portion. As a substitute, a tube (tube member) 210*c*' that forms a ball circulation path and a press member 210*d*' are composed of an alloy exhibiting a higher specific gravity than steel. Further, the press member 210*d*' is, though formed in the plate-like shape in the embodiment discussed above, formed in a block-like shape to increase a volume, thereby raising an actual weight. To be specific, the tube 210*c*' and the press member 210*d*', which are provided on a flat surface 210*f*, have each a larger unit weight than in the embodiment discussed above, and, even when providing none of the balancing cut portions, the rotational balance of the nut 210' can be made preferable. Note that tubes 210*c*' and the press members 210*d*' are sorted out according to their different unit weights into groups and thus preserved, wherein those that will be well-balanced with the actual nut 210' may be selected. Moreover, the balance cut portion may also be provided in combination.

The present invention has been discussed so far in a way that refers to the embodiments but should not be construed as limited to the embodiments discussed above. The present invention can be, as a matter of course, properly changed and improved. For instance, the cam surface 204*d* in the power transmission mechanism 250 has been explained as the unidirectionally-inclined type as shown in FIG. 12, however, a bidirectionally-inclined type may also be available. Further, a biasing means such as a preload spring or the like that presses the roller 206 in a locking direction, may be arbitrarily provided for improving the stability when locked.

Next, a different embodiment will be described with reference to the drawings. FIG. 15A is a sectional view showing the electric parking brake drive apparatus by way of one example of the linear actuator as an eighth embodiment. FIG. 15B is a view of the construction in FIG. 15A as viewed in XVB-direction. FIG. 16 is a view of the construction in FIG. 15A in a way that cuts off the construction along the line XVI-XVI as viewed in an arrowhead direction. Note that FIG. 15A shows a state of delivering, wherein a movable case 313 is set in a state of being close to motor housing 301A.

In FIG. 15A, housing 301 is constructed of a cylindrical motor housing 301A and cylindrical main housing 301B that are connected to each other via a bolt 301C. A cylindrical stator 302*b* is fixed to an inner peripheral surface of the motor housing 301A, and embraces a rotor 302*c*. The rotor 302C is attached to an outer peripheral surface of a rotary shaft 303 rotatably supported via bearings 309A and 309B with respect to the motor housing 301A, whereby the rotary shaft 303 and the rotor 302*c* rotate together. A commutator 302*f* is disposed on an outer periphery of the rotary shaft 303 adjacently to the rotor 302*c*, and a brush 302*e* is slidably contiguous to this outer peripheral surface thereof. An electric motor 302 has the stator 302*b*, the rotor 302*c*, the brush 302*e*, the commutator 302*f* and the rotary shaft 303.

An aperture 301*g* having an inside diameter slightly larger than the outside diameter of the rotary shaft 303 is formed in a left side end of the motor housing 301A in FIG. 15A. The aperture 301*g* is closed by a cover 328 fitted to the motor housing 301A by use of a bolt 319.

A portion of the rotary shaft 303, which receives an insertion of the screw shaft 311, is hollowed, and a side end portion of the rotary shaft 303 has a hole 303*d* taking a non-circular shape in section as shown in FIG. 15B. Further, the rotary shaft 303 is formed with, at a right side end in FIG. 15A, a large-diameter portion 303*a* rotatably supported via a bearing 309B with respect to the motor housing 301A, and a plurality of pawl portions 303*b* (six pieces are provided in this example) protruding from the large-diameter portion 303*a* in an axis-line direction. Note that an outer race of the bearing 309B is fitted to both of the inner peripheral surface of the motor housing 301A and the inner peripheral surface of the main housing 301B, whereby the main housing 301B and the electric motor 302 are aligned with each other. This contrivance that the outer race of the bearing 309B is fitted to both of the inner peripheral surface of the motor housing 301A and the inner peripheral surface of the main housing 301B, is convenient to handle, for instance, in the case of assembling and making an inspection because of the rotary shaft 303 being supported on the two bearings 309A and 309B even when the main housing 301B is separated from the motor housing 301A.

The main housing 301B takes such a configuration as to connect a major cylindrical portion 301a and a minor cylindrical portion 301b to each other. An outer race 305 defined as a fixing portion is fitted to an inner peripheral surface of the major cylindrical portion 301a. As lock members, rollers 306 (three pieces are provided in this example) and keys 307 (three pieces are provided in this example) are so disposed as to be alternately pinched in between the adjacent pawl portions 303b inwards in a radial direction of the outer race 305. The outer race 305 has a flange portion 305g protruding inwards in the radial direction at a right side end in FIG. 15A, and this flange portion 305g prevents the rollers 306 from moving in the axis-line direction.

The roller 306 is rollable on an outer peripheral surface of a cylindrical rotation driven member 304 rotatably supported via a bearing 308 with respect to the major cylindrical portion 301a of the main housing 301B. A configuration of the outer peripheral surface of the rotation driven member 304 will be explained with reference to FIG. 16 later on. A nut 310 is so fitted to an inner peripheral surface of the rotation driven member 304 as to be impossible of relative rotations by press-fitting or fitting of D-shaped sectional portions to each other, and so on. A screw shaft 311 is inserted through within the nut 310. The screw shaft 311 is formed further extending to an interior of the rotary shaft 303, thereby providing a compact construction in the axis-line direction.

A thread groove 311a (which is partly illustrated) is formed in an outer peripheral surface of a left half portion of the screw shaft 311 as viewed in FIG. 15A. On the other hand, a thread groove 310a (which is partly illustrated) is formed, opposite to the thread groove 311a, in an inner peripheral surface of the nut 310. A multiplicity of balls 312 are so disposed as to be rollable in a helical space formed by the thread grooves 310a, 311a. It should be noted that there is provided, though not shown, a path for returning the balls 312 from one end to the other end of the rotation driven member 304 when in operation. The nut 310, the screw shaft 311 and the balls 312 build up a ball screw mechanism.

A right half portion of the screw shaft 311 is formed as a round shaft portion 311b as viewed in FIG. 15A, and a cylindrical movable case 313 is disposed at a front side end of the round shaft portion 311b. The movable case 313 covering the round shaft portion 311b irrespective of a position of the screw shaft 311 in the axis-line direction, includes a major cylinder 313a, a short minor cylinder 313b disposed coaxially at a right side end of the major cylinder 313a as viewed in FIG. 15A, and a flange portion 313c that connects the major cylinder 313a and the minor cylinder 313b to each other. A keyway 313d is formed in an inner peripheral surface of the minor cylinder 313b, and the minor cylinder 313b is so fitted as to be incapable of rotating to a right side end of the screw shaft 311 as viewed in FIG. 1 via a key 314 disposed in this keyway 313d and is further hindered by a stop ring 315 from being removed out of the screw shaft 311. One ends of a pair of wires 316 are connected to an end face of the flange portion 313c, while the other ends of the wires 316 are connected to an unillustrated parking brake apparatus. The wires 316 as the driven members move left in FIG. 15A to operate the brake apparatus, thereby giving a braking force to unillustrated traveling wheels. The wires 316 move right in FIG. 15A, thereby canceling the braking of the brake apparatus. Note that the wires 316 are invariably biased in the right direction in FIG. 15A by unillustrated springs or the like.

In the movable case 313, a rectilinear groove 313e extending from the left side end in FIG. 15A is formed in an inner peripheral surface of the major cylinder 313a. A pin 317, of which a head portion 317a engages with the rectilinear groove 313e, is embedded in a right side end outer peripheral surface of the minor cylindrical portion 301b of the main housing 301B as viewed in FIG. 15A. The movable case 313 is therefore incapable of the relative rotations with respect to the main housing 301B but is relatively movable in the axis-line direction. A partition wall 301c for supporting via a bush 301d the round shaft portion 311b of the screw shaft 311, is formed in a central inner periphery of the minor cylindrical portion 301b of the main housing 301B. A gasket 318 is disposed adjacent (on the right side in FIG. 15A) to the partition wall 301c, thereby hermetically sealing between the outer peripheral surface of the round shaft portion 311b and the inner peripheral surface of the minor cylindrical portion 301b. This configuration functions so as to prevent foreign matters from entering.

A power transmission mechanism 350 includes the rotary shaft 303 as a rotation driving portion, the rotation driven member 304 as a rotation driven portion, the outer race 305, and the ball screw mechanism (312, 310, 311) as a converting mechanism.

A construction of the power transmission mechanism 350 will be described in depth. In FIG. 16, the rotation driven member 304 has three lines of keyways 304c in this example and three pieces of cam surface 304d in this example, which are formed alternately at equal intervals along an outer peripheral surface thereof. The cam surface 304d takes a configuration of an inclined surface inclined in one direction far apart from an axis of rotation (axial center) as it goes clockwise in FIG. 16.

Let "a" be intervals between the key 307 and the pawl portions 303b provided on both sides of the key 307, "b" be an interval between the roller 306 and the left-sided pawl portion 303b as viewed in FIG. 16 in a state (a second position) where the roller 306 bites in between the outer race 305 and the rotation driven member 304 as indicated by a dotted line in FIG. 16, and "c" be an interval between the roller 306 and the right-sided pawl portion 303b, wherein there is established a relationship such as b>a>c.

Figure 17A:
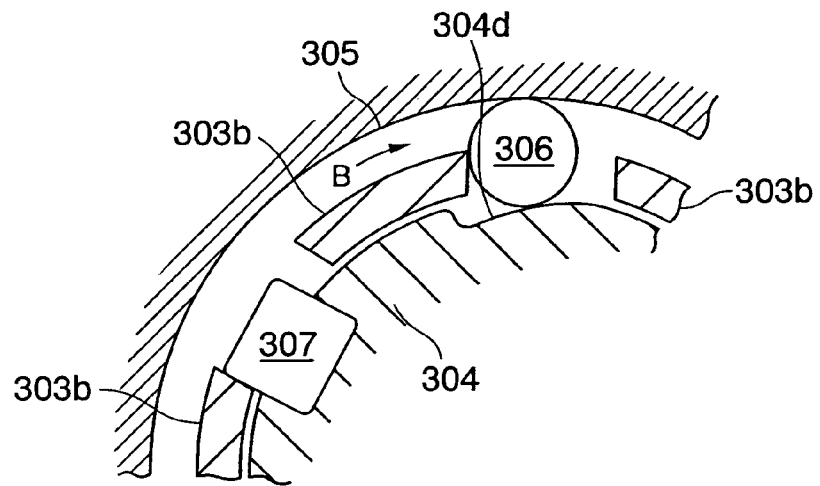
FIGS. 17A, 17B and 17C are views showing an operation of the power transmission mechanism in the eighth embodiment.
Figure 17B:
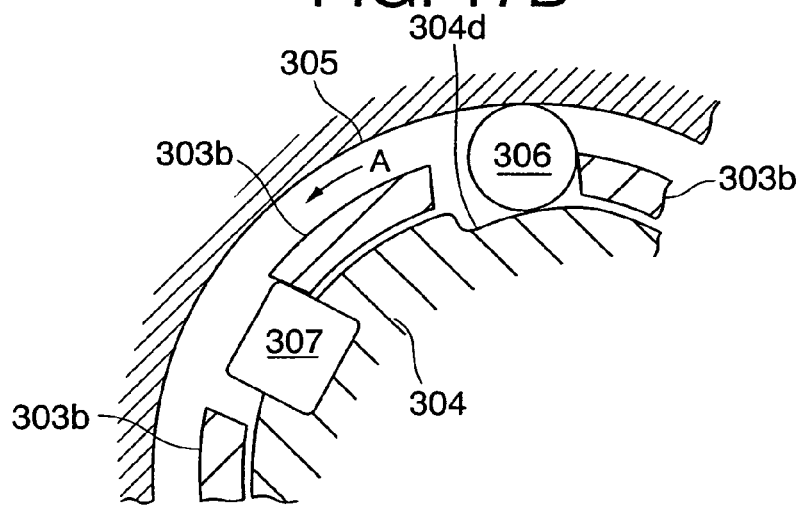
Figure 17C:
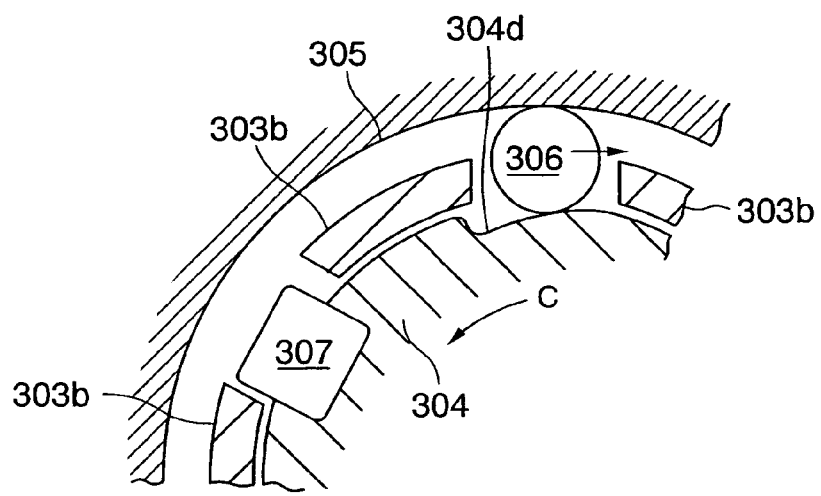

An operation in the eighth embodiment will be explained with reference to the further-added drawing in FIG. 17 showing an operation of the power transmission mechanism 350. In FIG. 15A, when the driver performs the predetermined operation for operating the parking brake apparatus, an unillustrated power source supplies the electric motor 302 with the electric power, whereby the rotary shaft 303 rotates relatively to the rotation driven member 304. At this time, supposing that the pawl portion 303b rotates in a direction of an arrowhead B in FIG. 17A, an end face of the pawl portion 303b adjacent to the roller 306 tries to abut on the roller 306, however, the interval relationship between the pawl portions 303b, the roller 306 and the key 307 is given by (b>a>c) as described above, and therefore, before moving the roller 306 to the second position (indicated by the dotted line in FIG. 16), the end face of the pawl portion 303b adjacent to the key 307 presses the key 307, whereby the rotary shaft 303 and the rotation driven member 304 rotate integrally. When the nut 310 rotates together with the rotation driven member 304, the screw shaft 311 so supported as to be incapable of rotating with respect to the main housing 301B through the movable case 313, is extruded in the axis-line direction in a low friction state by the balls 312 rolling along the helical space formed by thread grooves 310a, 311a, i.e., a rotational displacement is converted into an axis-line-directional displacement. The movable case 313 moves as the screw shaft 311 moves in the axis-line direction, and hence such motive power is transmitted to the unillustrated parking brake apparatus via the wires 316, thereby giving the braking force to the unillustrated traveling wheels.

On the other hand, after the electric motor 302 has halted, the biasing force (or a brake reactive force may also be available) generated by the unillustrated spring acts on the wires 316 at all times, so that the axis-line directional displacements of the movable case 313 and the screw shaft 311 which are biased by this biasing force are converted into a rotational displacement of the rotation driven member 304 through the nut 310, with the result that the rotation driven member 304 tries to rotate relatively to the rotary shaft 303. In such a case, the cam surface 304d tries to rotate in a direction of an arrowhead C in FIG. 17C, and hence the roller 306 receives a force from the static outer race 305 and is thereby pressed (biased) toward an upper portion of the cam surface 304d, i.e., toward the side (the second position) far apart from the axis of rotation. The roller 306 is thereby stretched between the outer race 305 and the cam surface 304d, thus giving the frictional force. This is termed a lock state. Such a lock state hinders the rotation of the rotation driven member 304, and hence, even when the biasing force of the wires 316 is comparatively large, the braking force of the unillustrated brake apparatus can be maintained.

Moreover, when the driver performs the predetermined operation for canceling the parking brake apparatus in order to start a vehicle, the electric motor 302 is supplied with the electric power assuming a reverse polarity from the unillustrated power source, whereby the rotary shaft 303 rotates relatively to the rotation driven member 304. At this time, when the pawl portion 303b rotates in an arrowhead-A direction in FIG. 17B, the end face of the pawl portion 303b adjacent to the key 307 abuts on the key 307, and the rotation driven member 304 is rotated in the same direction. Further, the end face of the pawl portion 303b adjacent to the roller 306 presses the roller 306 toward a lower portion of the cam surface 304d, i.e., toward the side (the first position) close to the axis of rotation, and hence it follows that the rotary shaft 303 and the rotation driven member 304 rotate integrally without any occurrence of bite-in of the roller 306.

Incidentally, in case the electric motor 302 does not work for some reason, in terms of the construction in the eighth embodiment, the screw shaft 311 does not move to the right in FIG. 15A even when the wires 316 are pulled by a strong force. Consequently, the parking brake apparatus can not be canceled, thereby making it difficult to spontaneously travel to, e.g., a maintenance shop or the like.

Then, in such a case, the parking brake apparatus can be canceled in the following manner. To start with, a cover 328 is removed from the motor housing 301A by slackening the bolt 319. The cover being thus removed, the aperture 301g gets exposed, wherein a tool (not shown) is inserted through this aperture 301g and engages with the hole 303d assuming the non-circular shape in section, thereby rotating the rotary shaft 303 manually (or which may involve driving an external motor) by use of a tool. When the rotary shaft 303 rotates, the screw shaft 311 moves in the axis-line direction through the power transmission mechanism 350, and the parking brake can be canceled by slackening the wire 316.

In addition, an advantage of applying this type of linear actuator to the electric type parking brake apparatus or the like, is that it is possible to readily manually attach the wires 316 and make a tension adjustment without supplying the electric motor 302 with the electric power when mounted on the vehicle. More specifically, in the linear actuator delivered in the state shown in FIG. 15A, the tool is engaged with the rotary shaft 303 via the aperture 301g that gets exposed by removing the cover 328, and, when the rotary shaft 303 is arbitrarily rotated by use of this tool, the movable case 313 moves to the right in FIG. 15A, thereby enabling the connection to the wires 316 and the tension adjustment of the wires 16. After the adjustment, the cover 328 is secured to the motor housing 301A by using the bolt 319.

FIG. 18A is a sectional view of the electric parking brake drive apparatus according to a ninth embodiment. FIG. 18B is a view of the construction in FIG. 18A as viewed in an XVIIIB-direction. As shown in FIG. 18A, the electric parking brake drive apparatus according to the ninth embodiment is different in terms of only a configuration of the rotary shaft from the construction shown in FIGS. 15A and 15B, and therefore the common main components are marked with the same reference symbols, of which the explanations are omitted.

A rotary shaft 403 has an engagement surface (non-cylindrical surface) 403c extending from its left side end as viewed in FIG. 18A, of which an outer peripheral surface is partly cut in parallel. Note that a central hole 403d of the rotary shaft 403 is circular in section in the ninth embodiment. According to the ninth embodiment also, the screw shaft 311 can be moved in the manner that follows. To begin with, the cover 328 is removed from the motor housing 301A by slackening the bolt 319. The cover being thus removed, the aperture 301g of the motor housing 301A gets exposed, wherein a tool (not shown) is inserted through this aperture 301g and engages with the engagement surface 403c, thereby rotating the rotary shaft 403 manually (or which may involve driving an external motor) by use of a tool. When the rotary shaft 403 rotates, the screw shaft 311 moves in the axis-line direction through the power transmission mechanism 350, and the parking brake can be canceled by slackening the wire 316.

Figures 19A, 19B:
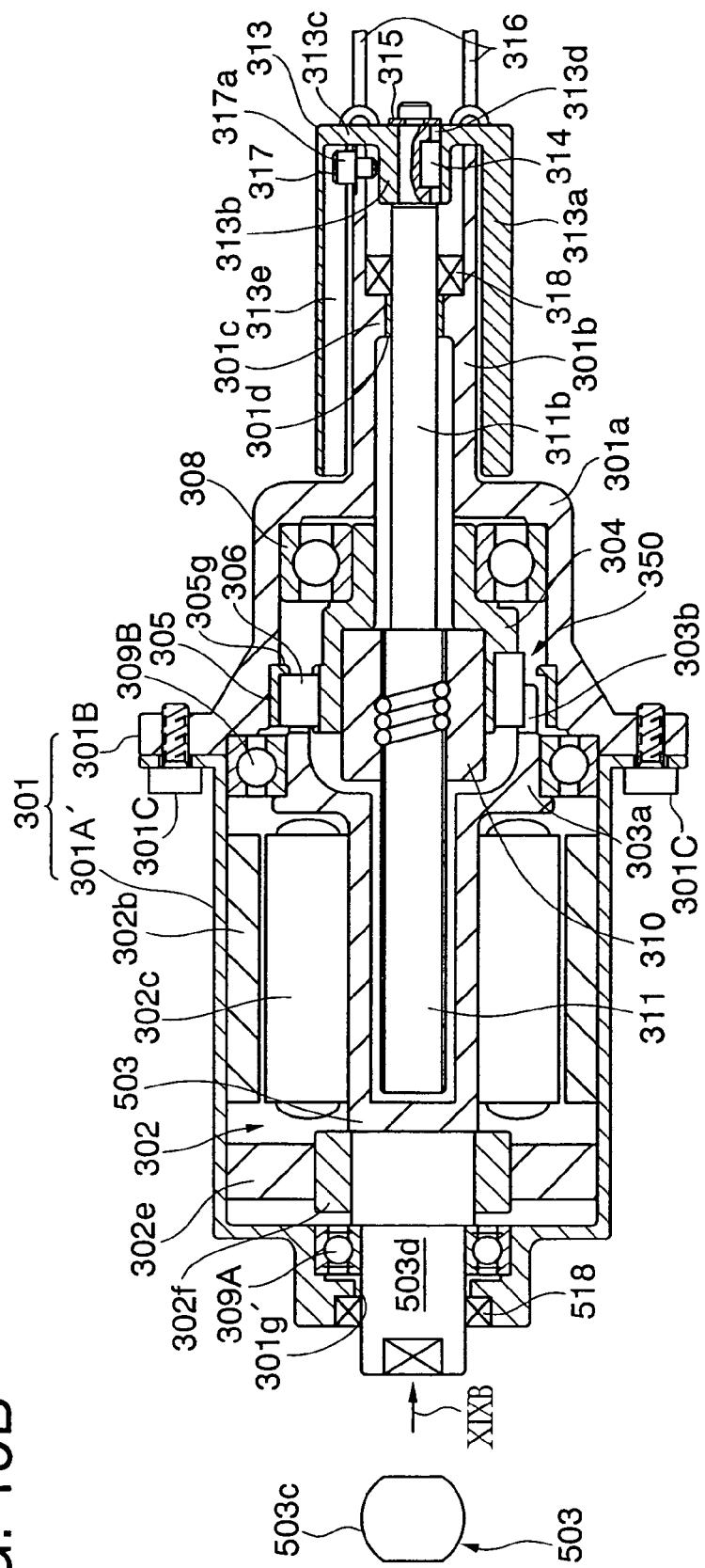
FIGS. 19A and 19B are sectional views of the linear actuator in a tenth embodiment.

FIG. 19A is a sectional view of the electric parking brake drive apparatus according to a tenth embodiment. FIG. 19B is a view of the construction in FIG. 19A as viewed in an XIXB-direction. As shown in FIG. 19A, the electric parking brake drive apparatus according to the tenth embodiment is different in terms of only configurations of the motor housing and of the rotary shaft from the construction shown in FIGS. 15A and 15B, and therefore the common main components are marked with the same reference symbols, of which the explanations are omitted.

A rotary shaft 503 according to the tenth embodiment has, only at the right side in FIGS. 19A and 19B, a sack hole embracing the screw shaft 311. Further, a left side end 503d of the rotary shaft 503 in FIG. 19 is solid and protrudes outward via an aperture 301g' of motor housing 301A'. A seal 518 is attached to an inner periphery of a side end portion of the aperture 301g' of the motor housing 301A', and hermetically seals an outer peripheral surface of the left side end 503d in a way that comes into contact with this outer peripheral surface. The left side end 503d has an engagement surface (non-cylindrical surface) 503c of which an outer peripheral surface is partly cut in parallel.

In the tenth embodiment also, the unillustrated tool is engaged with the engagement surface 503c of the left side end 503d of the rotary shaft 503, thereby rotating the rotary shaft 503 manually (or which may involve driving the external motor) by use of the tool. When the rotary shaft 503 rotates, the screw shaft 311 moves in the axis-line direction through the power transmission mechanism 350, and, for example, the parking brake can be canceled by slackening the wire 316. An advantage according to the tenth embodiment is that there is no necessity of removing the cover or the like in order to rotate the rotary shaft 503 by use of the tool, and it is not laborious to make the adjustment, etc.

FIG. 20A is a sectional view, similar to FIG. 16, showing a construction of the electric parking brake drive apparatus according to an eleventh embodiment. FIG. 20B is a front view of a spring member. The eleventh embodiment is different from the embodiment shown in FIGS. 15A and 15B in terms of only such a point that a spring member 330 is fitted to the pawl portion 203b, and the explanation of the configuration other than this is omitted.

As shown in FIG. 20B, the spring member 330 is composed of a plate material bent substantially in a C-shape complementary to an external shape of the pawl portion 303b, and has at its side end portion an elastic piece 330a. As shown in FIG. 20A, the spring members 330 are so mounted as to engage with a peripheral surface of every other pawl portion 303, in which state the elastic piece 330a biases the adjacent roller 306 towards the aforementioned rotation hindering position. Accordingly, in the tenth embodiment, unless the pawl portion 303b rotates, the rotation driven portion 304 is always kept in the locked state.

When the spring member 330 is mounted on the pawl portion 303b, however, there is to arise a problem, wherein the spring member 330 might be a hindrance against the assembly. The tenth embodiment, even when the spring members 330 are provided, facilitates the assembly. The following is an elucidation thereof.

Figure 21:
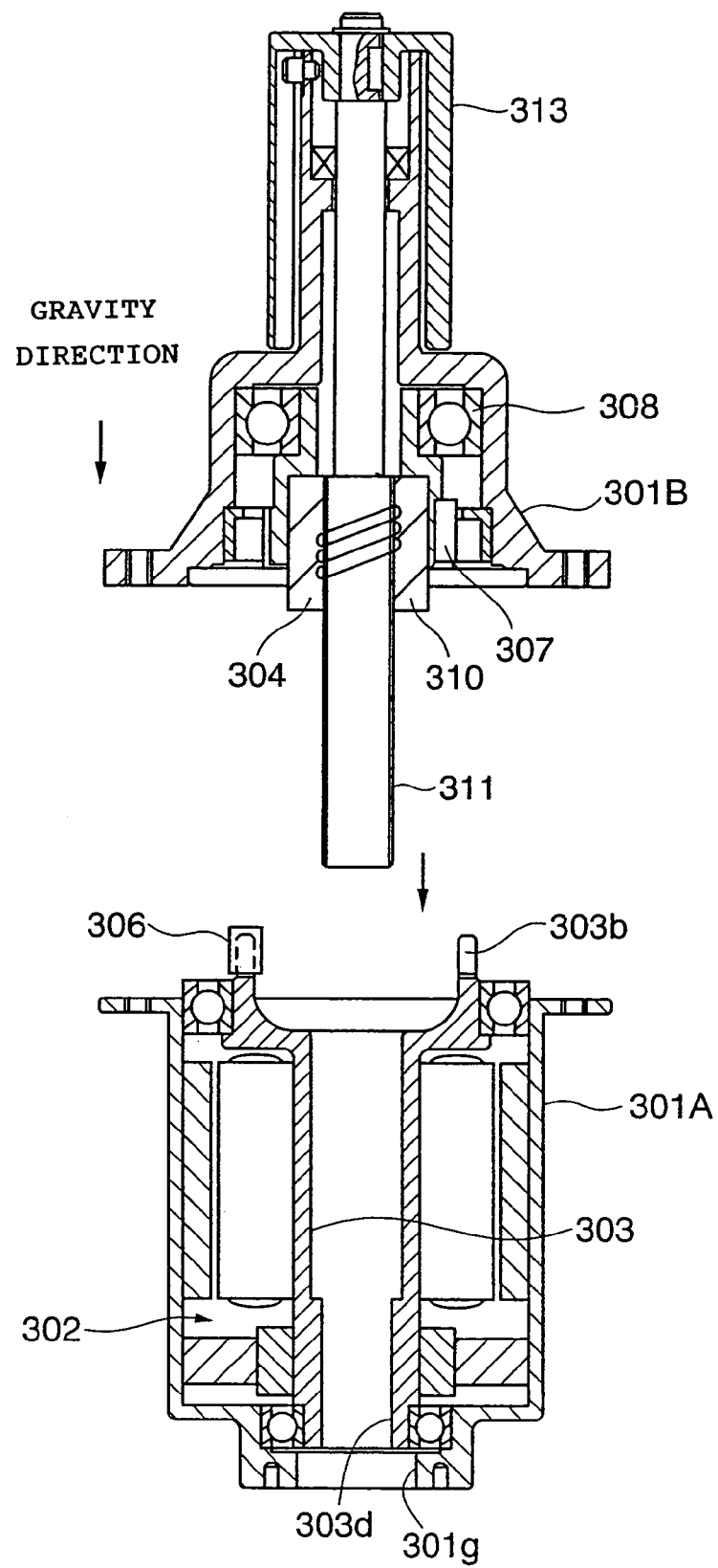
FIG. 21 is a view showing an assembling state of the electric parking brake drive apparatus in the eleventh embodiment.

FIG. 21 is a view showing a state of how the electric parking brake drive apparatus according to the tenth embodiment is assembled. As described above, the electric parking brake drive apparatus in the tenth embodiment has the same construction as the construction shown in FIGS. 15A and 15B except the spring member 330, and hence the main components are marked with the same reference symbols, of which the explanations are omitted.

In the case of combining the motor housing 301A and the main housing 301B with each other in a state where the motor housing 301a incorporates the motor 302, etc. while the main housing 301B incorporates the screw shaft 311, the ball screw nut 310, etc., the pawl portions 303b on the side of the motor housing are previously fitted with the spring members 330, and the rollers 306 are disposed adjacent thereto. This is the state shown in FIG. 21. Further, the main housing 301B is descended while setting coaxial with the motor housing 301A, and eventually there is a necessity of disposing the roller 306 between the inclined surface 304d of the rotation driven portion 304 and the outer race 305. If the spring member 330 keeps biasing the roller 306 toward the side corresponding to the rotation hindering position, however, the side end portion thereof butts against a narrow gap between the inclined surface 304d and the outer race 305, with the result that the assembly can not be done.

Such being the case, according to the tenth embodiment, the cover 328 is removed beforehand from the motor housing 301A, and the tool (unillustrated) is inserted through the exposed aperture 301g and engages with the hole 303d taking the non-circular shape in section, thereby manually rotating the rotary shaft 303 in an arrowhead direction in FIG. 20A by use of the tool. Then, as shown in FIG. 20A, the pawl portion 303b mounted with none of the spring members 330 abuts on the roller 306 and extrudes the roller 306 towards a rotation allowable position (a first position). In such a state, when descending the main housing 301B below the motor housing 301A, the roller 306 can be inserted into a wide open space as a gap between the inclined surface 304d of the rotation driven portion 304 and the outer race 305, whereby the assembly can be attained.

The present invention has been discussed so far in a way that refers to the embodiments but should not be construed as limited to the embodiments discussed above. The present invention can be, as a matter of course, properly changed and improved. For instance, the engagement of the tool involves forming the rotary shaft with the 2-face parallel hole or external configuration taking the non-circular shape in section. Without being limited to this configuration, however, it can be considered that there is formed a hole or an external configuration or a keyway taking a polygonal shape in section that is coaxial with the rotation drive portion assuming a D-shape in section, or alternatively a thread portion connectable to a tool.

Figure 22:
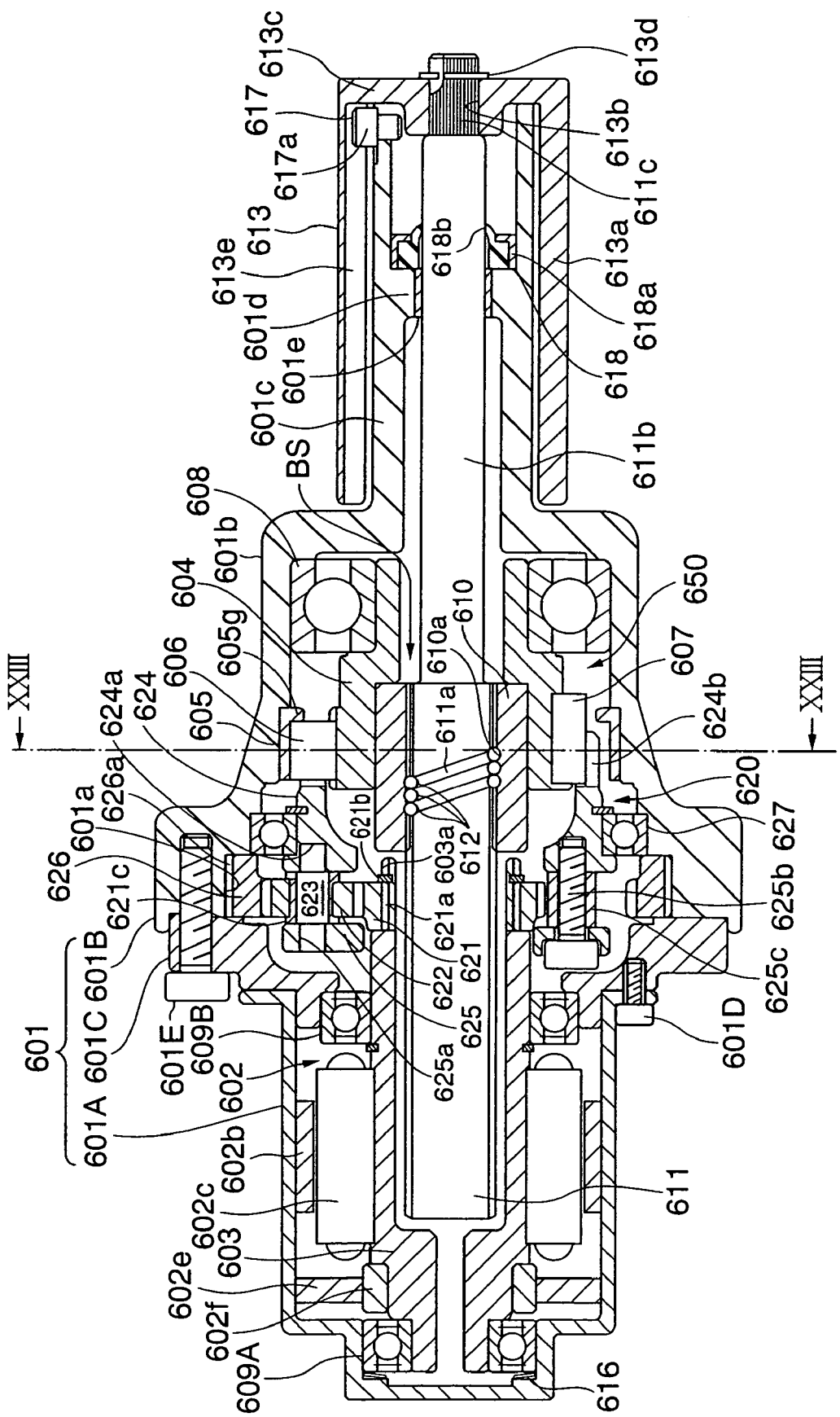
FIG. 22 is a sectional view of the linear actuator in a twelfth embodiment.
Figure 23:
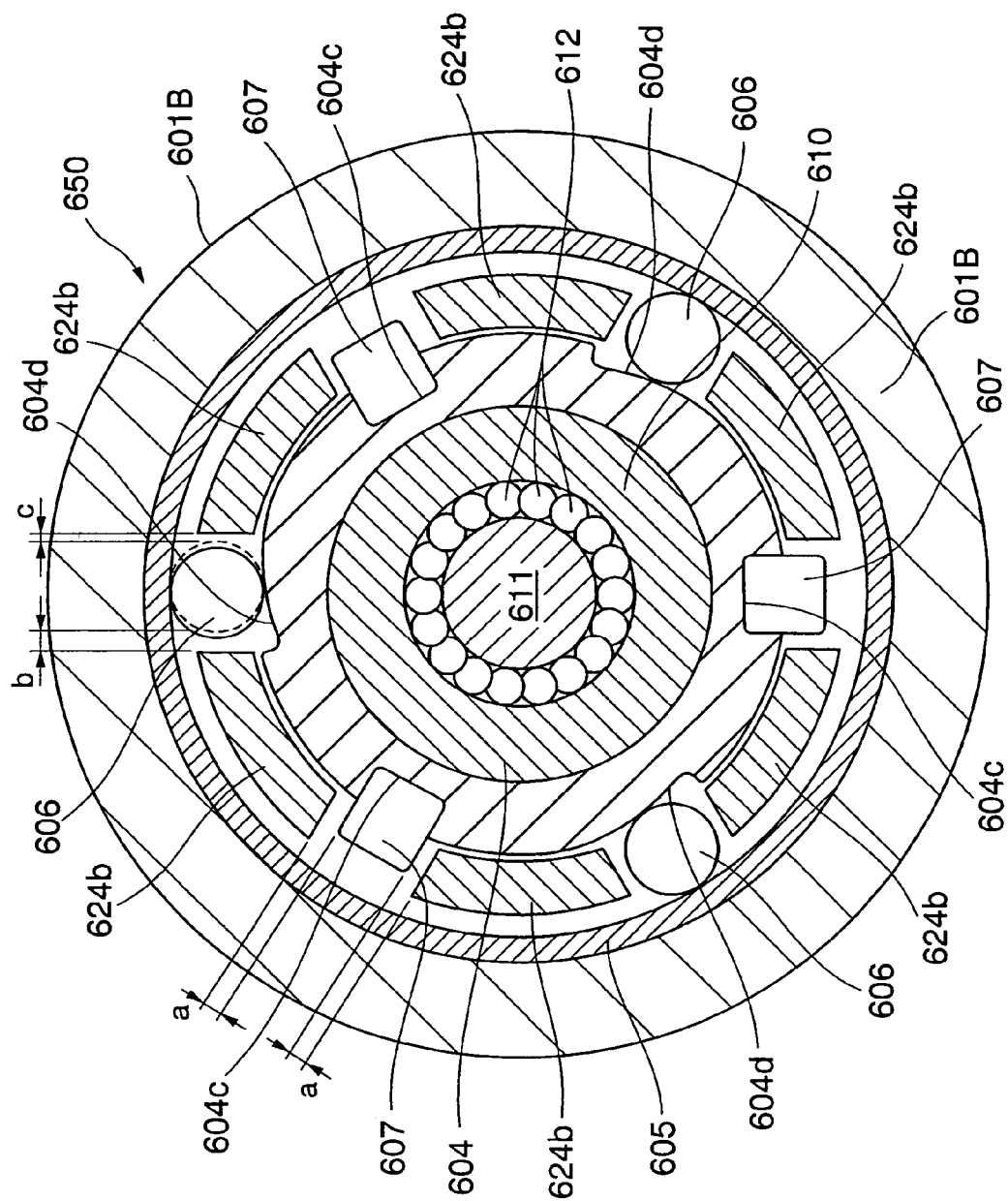
FIG. 23 is a view showing a construction cut off along the line XXIII-XXIII in FIG. 22 as viewed in an arrowhead direction.

Next, a different embodiment of the invention will be described with reference to the drawings. FIG. 22 is a sectional view showing the linear actuator by way of a twelfth embodiment. FIG. 23 is a view of the construction in FIG. 22 in a way that cuts the construction along the line XXIII-XXIII as viewed in an arrowhead direction.

In FIG. 22, cylindrical motor housing 601A is connected via a bolt 601D to a ring-shaped intermediate housing 601C, and the intermediate housing 601C is connected via a bolt 601E to main housing 601B. A fixed case, i.e., housing 601 is constructed of the motor housing 601A, the intermediate housing 601C and the main housing 601B. Note that the motor housing 601A is fitted on an outer periphery of the intermediate housing 601C, wherein mutual centering is conducted. Then, the intermediate housing 601C is fitted in an inner periphery of the main housing 601B, wherein mutual centering is performed.

A cylindrical stator 602b is fixed to an inner peripheral surface of the motor housing 601A, and embraces a rotor 602c. The rotor 602C is attached to an outer peripheral surface of a rotary shaft 603 rotatably supported via bearings 609A and 609B with respect to the motor housing 601A, whereby the rotary shaft 603 and the rotor 602c rotate together. A commutator 602f is disposed on an outer periphery of the rotary shaft 603 adjacently to the rotor 602c, and a brush 602e is slidably contiguous to this outer peripheral surface thereof. An electric motor 602 has the stator 602b, the rotor 602c, the brush 602e, the commutator 602f and the rotary shaft 603. It should be noted that an outer race of the bearing 609A is pressed (biased) by a spring 616 in the axis-line direction against the motor housing 601A, and therefore, after being assembled, a preload is applied to the bearings 609A, 609B.

The rotary shaft 603 is hollowed and is formed, at its right side end in FIG. 22, with a male serrated portion 603a. A sun gear 621 has a female serrated portion 621 formed in its inner periphery. The sun gear 621 is so fitted as to rotate integrally with the rotary shaft 603 by engaging the serrated portions 603a and 621a with each other. The sun gear 621 is prevented from being removed out of the rotary shaft 603 by a stop ring 621b fitted into the rotary shaft 603.

The sun gear 621 meshes with a plurality of planetary gears 622 disposed outward in the radial direction thereof. The hollowed planetary gear 622 rotatably engages with an outer peripheral surface of a pin 623 through a collared bush 621c. A right side end, as viewed in FIG. 22, of the pin 623 is press-fitted in a hole 624a of a carrier 624. A left side end, as viewed in FIG. 22, of the pin 623 is press-fitted in a hole 625a of a cover member 625 disposed facing the carrier 624. The cover member 625 keeps an interval from the carrier 624 through a collar 625c fitted to an outer periphery of a bolt 625b and is fixed to the carrier by the bolt 625b. The carrier 624 is rotatably supported on a bearing 627 with respect to the main housing 601B.

Further, a ring gear 626 with which the planetary gear 622 meshes inward in the radial direction, is formed with a male serrated portion 626a. The main housing 601B is formed with a female serrated portion 601a along its inner periphery. The ring gear 626 is fixedly fitted to the main housing 601B by engaging the serrated portions 626a, 601a with each other. A planetary type speed reduction gear unit 620 is constructed of the sun gear 621, the planetary gears 622, the pin 623, the carrier 624, the cover member 625 and the ring gear 626.

Further, the carrier 624 is formed with a plurality of pawl portions 624b (six pieces are provided in this example) protruding in the axis-line direction on the right side in FIG. 22.

The main housing 601B takes such a configuration as to connect a major cylindrical portion 601b and a minor cylindrical portion 601c to each other. An outer race 605 defined as a fixing portion is fitted to an inner peripheral surface of the major cylindrical portion 601b. As lock members, rollers 606 (three pieces are provided in this example) and keys 607 (three pieces are provided in this example) are so disposed as to be alternately pinched in between the adjacent pawl portions 624b inwards in a radial direction of the outer race 605. The outer race 605 has a flange portion 605g protruding inwards in the radial direction at a right side end in FIG. 22, and this flange portion 605g prevents the rollers 606 from moving in the axis-line direction.

The roller 606 is rollable on an outer peripheral surface of a cylindrical rotation driven member 604 rotatably supported via a bearing 608 with respect to the major cylindrical portion 601b of the main housing 601B. A configuration of the outer peripheral surface of the rotation driven member 604 will be explained with reference to FIGS. 23 and 24 later on. A nut 610 is so fitted to an inner peripheral surface of the rotation driven member 604 as to be impossible of relative rotations by press-fitting or fitting of D-shaped sectional portions to each other, and so on. A screw shaft 611 is inserted through within the nut 610. The screw shaft 611 is formed further extending to an interior of the rotary shaft 603, thereby providing a compact construction in the axis-line direction.

A thread groove 611a (which is partly illustrated) is formed in an outer peripheral surface of a left half portion of the screw shaft 611 as viewed in FIG. 22. On the other hand, a thread groove 610a (which is partly illustrated) is formed, opposite to the thread groove 611a, in an inner peripheral surface of the nut 610. A multiplicity of balls 612 are so disposed as to be rollable in a helical space formed by the thread grooves 610a, 611a. It should be noted that there is provided, though not shown, a path for returning the balls 612 from one end to the other end of the rotation driven portion 604 when in operation. The nut 610, the screw shaft 611 and the balls 612 build up a ball screw mechanism BS. Note that a space accommodating the planetary type speed reduction gear unit 620, the power transmission mechanism 650 and the ball screw mechanism BS be, it is preferable, filled with the same lubricating agent such a grease, etc. In addition to these components, the bearings 627, 608 and so on can be also lubricated in the same way. If the bearings 627, 608 are constructed as sealed bearings, however, the lubrication may be conducted by use of a different lubricating agent. Moreover, the bearings 609A, 609B for bearing the rotary shaft 603 of the electric motor 602 are constructed as the sealed bearings, and it is therefore desirable that no grease be adhered to the interior (the rotor 602c, the stator 602b, etc.) of the electric motor 602.

A right half portion of the screw shaft 611 is formed as a round shaft portion 611b as viewed in FIG. 22. A cylindrical movable case 613 is so attached as to be incapable of the relative movement in the axis-line direction and incapable of the relative rotation by engaging the female serrated portion 613b with the male serrated portion 611c formed at a front side end of this round shaft portion 611b and by a stop ring 613d fitted into the screw shaft 611. The movable case 613 covering the round shaft portion 611b irrespective of a position of the screw shaft 611 in the axis-line direction, includes a major cylinder 613a and a flange portion 613c. According to the twelfth embodiment, the movable case 613 defined as a power transmitted portion is connected to, e.g., a wire (unillustrated) used for operating the unillustrated parking brake apparatus, and the parking brake apparatus can be operated by pulling this wire. The apparatus driven by the linear actuator according to the twelfth embodiment is not, however, limited to this type.

In the movable case 613, a rectilinear groove 613e extending from the left side end in FIG. 22 is formed in an inner peripheral surface of the major cylinder 613a. A pin 617, of which a head portion 617a engages with the rectilinear groove 613e, is embedded in a right side end outer peripheral surface of the minor cylindrical portion 601c of the main housing 601B as viewed in FIG. 22. The movable case 613 is therefore incapable of the relative rotations with respect to the main housing 601B but is relatively movable in the axis-line direction. A partition wall 601c for supporting via a bush 601e the round shaft portion 611b of the screw shaft 611, is formed in a central inner periphery of the minor cylindrical portion 601c of the main housing 601B. A gasket 618 including a core metal 618a and a lip 618b slidably abutting on the outer peripheral surface of the round shaft portion 611b is disposed adjacent (on the right side in FIG. 22) to the partition wall 601d, thereby hermetically sealing between the outer peripheral surface of the round shaft portion 611b and the inner peripheral surface of the minor cylindrical portion 601c. This configuration functions so as to prevent foreign matters from entering.

A power transmission mechanism 650 includes the carrier 624 as a rotation driving portion, the rotation driven member 604 as a rotation driven portion, the outer race 605 as the fixing portion, and the ball screw mechanism (612, 610, 611) as a converting mechanism.

A construction of the power transmission mechanism 650 will be described in depth. In FIG. 23, the rotation driven member 604 has three lines of keyways 604c in this example and three pieces of cam surface 604d in this example, which are formed alternately at equal intervals along an outer peripheral surface thereof. The cam surface 604d takes a configuration of an inclined surface inclined in one direction far apart from an axis of rotation (axial center) as it goes clockwise in FIG. 23.

Let "a" be intervals between the key 607 and the pawl portions 624b provided on both sides of the key 607, "b" be an interval between the roller 606 and the left-sided pawl portion 624b as viewed in FIG. 23 in a state (a second position) where the roller 606 bites in between the outer race 605 and the rotation driven member 604 as indicated by a dotted line in FIG. 23, and "c" be an interval between the roller 606 and the right-sided pawl portion 624b, wherein there is established a relationship such as b>a>c.

Figure 24A:
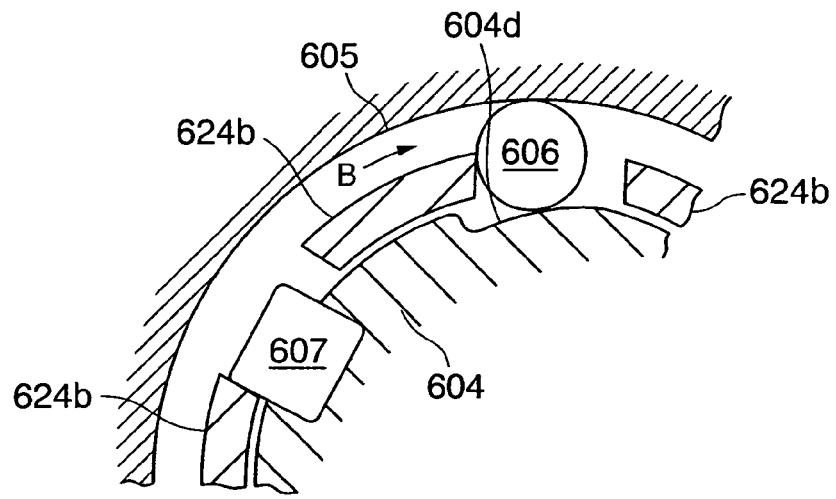
FIGS. 24A, 24B and 24C are views showing an operation of the power transmission mechanism in the twelfth embodiment.
Figure 24B:
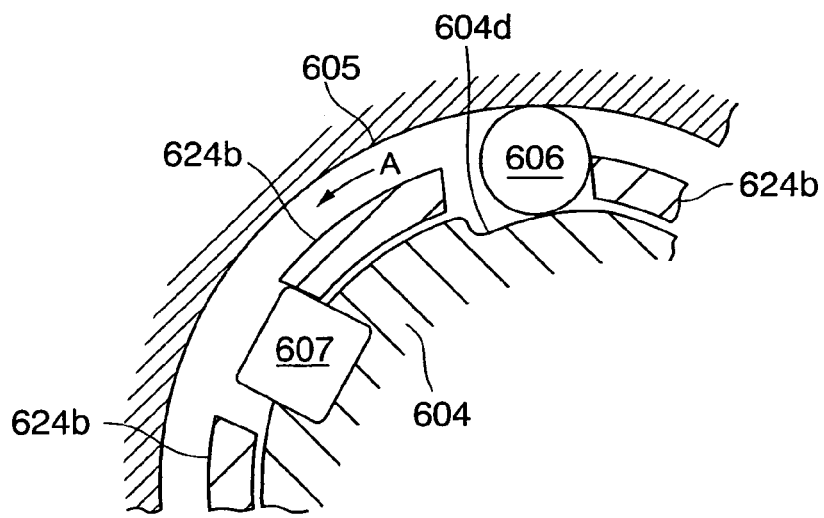
Figure 24C:
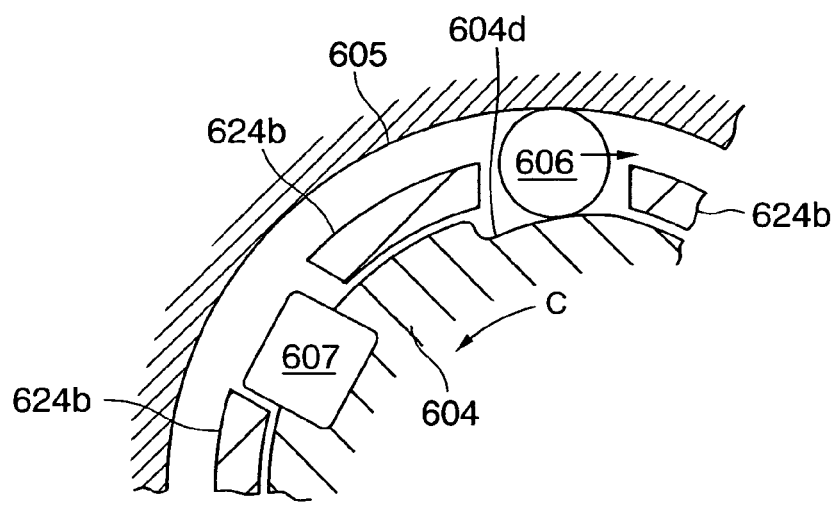

An operation in the twelfth embodiment will be explained with reference to the further-added drawings in FIGS. 24A, 24B and 24C showing an operation of the power transmission mechanism 650. In FIG. 22, when the driver performs, for example, a predetermined operation for operating the parking brake apparatus, the unillustrated power source supplies the electric motor 602 with the electric power, whereby the rotary shaft 603 rotates. Hereat, when the sun gear 621 attached to the rotary shaft 603, the planetary gears meshing with this sun gear 621 rotate, and therefore the carrier 624 is reduced at a predetermined speed reduction ratio based on a gear ratio of each gear and thus rates relatively to the rotation driven member 604. At this time, in FIG. 24A, when a protruded portion 603c rotates in an arrowhead-B direction, an end face of the pawl portion 624b adjacent to the roller 606 tries to abut on the roller 606, however, the interval relationship between the pawl portions 624b, the roller 606 and the key 607 is given by (b>a>c) as described above, and therefore, before moving the roller 606 to the second position (indicated by the dotted line in FIG. 23), the end face of the pawl portion 624b adjacent to the key 607 presses the key 607, whereby the carrier 624 and the rotation driven member 604 rotate integrally. When the nut 610 rotates together with the rotation driven member 604, the screw shaft 611 so supported as to be incapable of rotating with respect to the main housing 601B through the movable case 613, is extruded in the axis-line direction in a low friction state by the balls 612 rolling along the helical space formed by thread grooves 610a, 611a, i.e., a rotational displacement is converted into an axis-line-directional displacement. The movable case 613 moves as the screw shaft 611 moves in the axis-line direction, and hence such motive power is transmitted to the unillustrated brake apparatus via the unillustrated wire, thereby giving the braking force to the unillustrated traveling wheels.

On the other hand, after the electric motor 602 has halted, the biasing force (or a brake reactive force may also be available) generated by the unillustrated spring acts on the wire at all times, so that the axis-line directional displacements of the movable case 613 and the screw shaft 611 which are biased by this biasing force are converted into a rotational displacement of the rotation driven member 604 through the nut 610, with the result that the rotation driven member 604 tries to rotate relatively to the carrier 624. In such a case, the cam surface 604d tries to rotate in a direction of an arrowhead C in FIG. 24C, and hence the roller 606 receives a force from the static outer race 605 and is thereby pressed (biased) toward an upper portion of the cam surface 460d, i.e., toward the side (the second position) far apart from the axis of rotation. The roller 606 is thereby stretched between the outer race 605 and the cam surface 604d, thus giving the frictional force. This is termed a lock state. Such a lock state hinders the rotation of the rotation driven member 604, and hence, even when the biasing force of the wire is comparatively large, the braking force of the unillustrated parking brake apparatus can be maintained.

Moreover, when the driver performs the predetermined operation for canceling the parking brake apparatus in order to start a vehicle, the electric motor 602 is supplied with the electric power assuming a reverse polarity from the unillustrated power source, whereby the carrier 624 rotates relatively to the rotation driven member 604. At this time, when the pawl portion 624b rotates in an arrowhead-A direction in FIG. 24B, the end face of the pawl portion 624b adjacent to the key 607 abuts on the key 607, and the rotation driven member 604 is rotated in the same direction. Further, the end face of the pawl portion 624b adjacent to the roller 606 presses the roller 606 toward a lower portion of the cam surface 604d, i.e., toward the side (the first position) close to the axis of rotation, and hence it follows that the carrier 624 and the rotation driven member 604 rotate integrally without any occurrence of bite-in of the roller 606.

Figure 25:
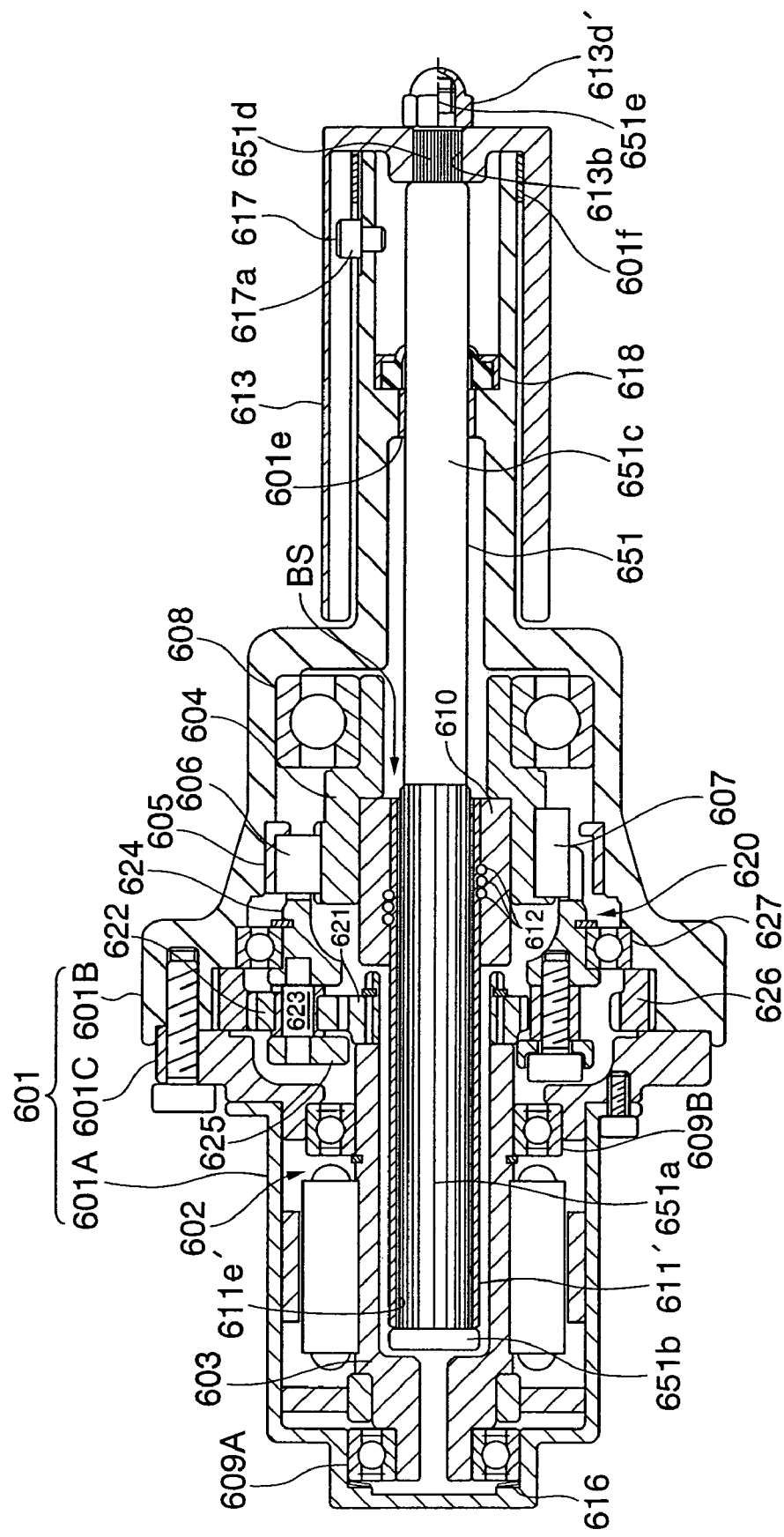
FIG. 25 is a sectional view of the linear actuator in a thirteenth embodiment.

FIG. 25 is a sectional view of the linear actuator according to a thirteenth embodiment. A main difference of the thirteenth embodiment from the embodiment in FIG. 22 is a construction of the screw shaft, and therefore the common main components are marked with the same reference symbols, of which the explanations are omitted.

In FIG. 25, a screw shaft 611' inserted through within the nut 610 is hollowed and has a female serration 611e' formed in its inner periphery. A drive shaft 651 made of a stainless steel, which is disposed within the screw shaft 611', has a male serration 651a in a left half portion in FIG. 25. The drive shaft 651 is formed with a come-off preventive flange 651b at its left side end, while its right half portion in FIG. 25 serves as a round shaft 651c. A serrated portion 651d is formed in the vicinity of the right side end of the drive shaft 651, and a male thread portion 651e is formed at its front side end.

The screw shaft 611' and the drive shaft 651 rotate integrally by engaging the female serrated portion 611e' of the screw shaft 611' with the male serrated portion 651a. Further, the male serrated portion 651d of the drive shaft 651 is engaged with the female serrated portion 613b, and a box nut 613d' is screwed to the male thread portion 651e, whereby the drive shaft 651 is so attached as to be incapable of the relative movement in the axis-line direction and incapable of the relative rotation with respect to the movable case 613. Note that the movable case 613 is biased toward the right side in FIG. 25 by an unillustrated spring, resulting in such a state that the come-off preventive flange 651b of the drive shaft 651 abuts on a left side end of the screw shaft 611' in FIG. 25, and the drive shaft 651 is fixed to the screw shaft 611' also in the axis-line direction. It is to be noted that in addition to the bush 601e, a bush 601f provided on the outer peripheral surface of the side end portion of the minor cylindrical portion 601c supports the main housing 601B and the movable case 613 in the thirteenth embodiment, and consequently a support rigidity of the movable case 613 can be more enhanced.

As in the thirteenth embodiment, the elongate stainless drive shaft 651 is inserted through within the short screw shaft 611', thereby making it possible to exhibit a rust preventive effect of the right half portion of the drive shaft 651 exposed to the atmospheric air. Moreover, since an entire length of the screw shaft 611' can be decreased, a merit is to facilitate working for the thread groove. Further, the screw shaft 611', which can be made of a steel, is therefore more expected in terms of increasing hardness by a thermal treatment, gains a longer life time and is less expensive of a working cost than being made of the stainless steel. Note that box nut 613d' hermetically shields the aperture of the right side end, as viewed in FIG. 25, of the movable case 613, and this can restrain the drive shaft 651 from being exposed to the atmospheric air, wherein the drive shaft 651 is not necessarily composed of the stainless steel.

Though common to the embodiments in FIGS. 22 and 25, if a low frictional layer is provided on an outer peripheral surface of the head portion 617a of a pin 617, a frictional resistance with the rectilinear groove 613e preferably decreases when the movable case 613 moves. The low frictional layer may be formed by coating a material such as a PTFE (polytetrafluoroethylene) resin or a POM (polyoxymethylene)(polyacetal) resin, etc. over the periphery of the head portion 617a, or by integral molding from such a material. Further, the pin 617 may be integrally molded from a 66 Nylon resin itself or may be formed by effecting a bonderizing treatment upon a steel material.

Figure 26:
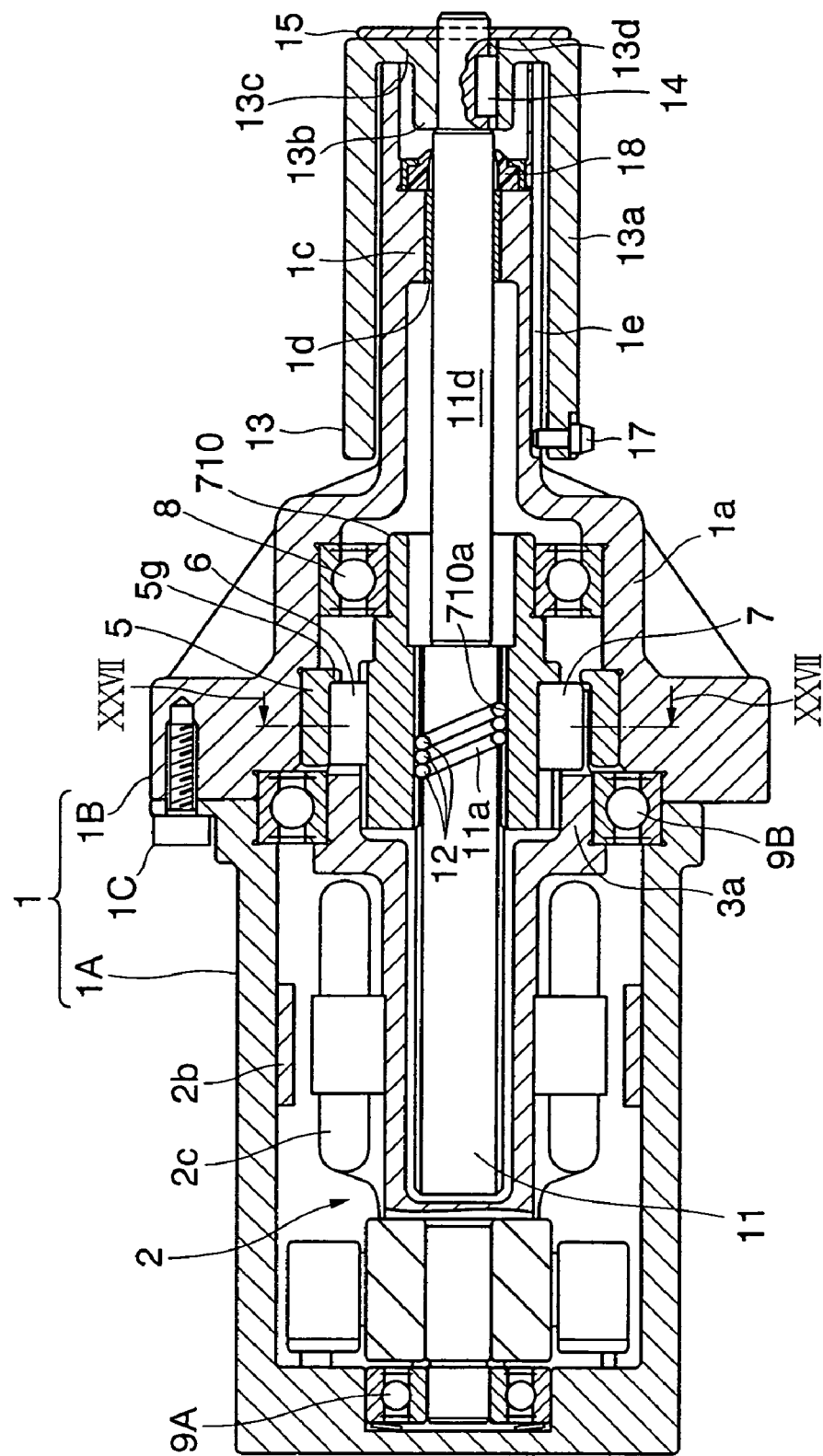
FIG. 26 is a sectional view of the linear actuator in a fourteenth embodiment.
Figure 27:
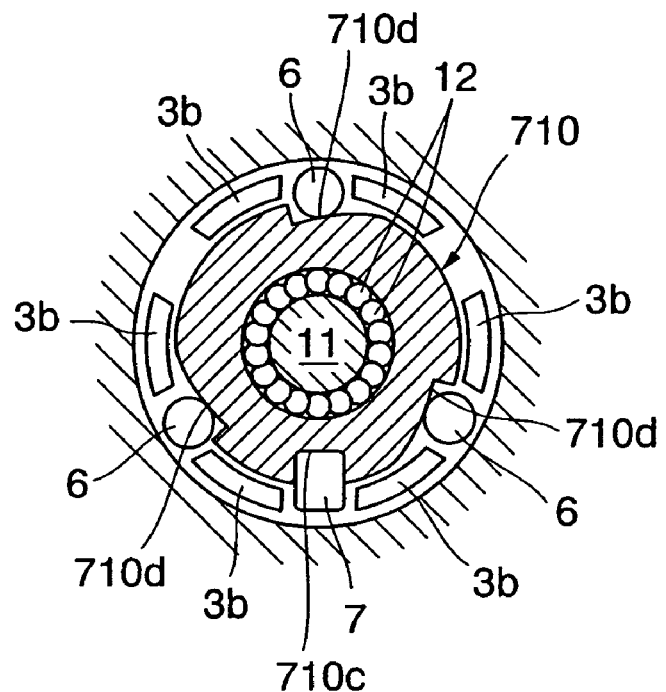
FIG. 27 is a view showing a construction cut off along the line XXVII-XXVII in FIG. 26 as viewed in an arrowhead direction.

FIG. 26 is a sectional view of the linear actuator according to a fourteenth embodiment. FIG. 27 is a view of the construction in a way that cuts the construction along the line XXII-XXII as viewed in an arrowhead direction. A main difference of the fourteenth embodiment from the embodiment illustrated in FIGS. 1 through 4 is a construction of the nut, and therefore the common components are marked with the same reference symbols, of which the explanations are omitted.

A construction peculiar to the fourteenth embodiment shown in FIGS. 26 and 27 will be more specifically described. Cam surfaces 710d and a keyway 710c are formed directly in an outer peripheral surface of a nut 710, and the nut 710 is rotatably supported by a bearing 8. Namely, instead of omitting the rotation driven member 4 shown in FIG. 1, the nut 710 constitutes a rotation driven portion. The cam surface 710d corresponds to the cam surface 4d in FIG. 3. Further, the keyway 710c corresponds to the keyway 4c in FIG. 3 but is formed by only one in the fourteenth embodiment.

Note that the main housing 1B has a rectilinear groove 1e extending from a right side end in FIG. 26, and, in the movable case 13, the pin 17 is embedded in the vicinity of a left side end, as viewed in FIG. 26, of the major cylinder 13a in the fourteenth embodiment. An inward side end of the pin 17 engages with the rectilinear groove 1e. Accordingly, as in the embodiment illustrated in FIG. 26, the movable case 13 is incapable of the relative rotation but is relatively movable in the axis-line direction with respect to the main housing 1B.

According to the fourteenth embodiment, the rotation driven member 4 shown in FIG. 1 is omitted, so that the number of components can be decreased, and it is feasible to further reduce the outside diameter of the main housing 1B while ensuring the capacity of the ball screw mechanism without changing the diameter of the nut 710.

Incidentally, the nut 710 is, corresponding to the relative rotations to the screw shaft 11, generally formed along its periphery with the path (tube or coma) for returning the ball 12 to its original position, which comes rolling along the thread groove 11a in the outer periphery of the screw shaft 11 and along the thread groove 710a in the inner periphery of the nut 710. Accordingly, it is a problem how a positional relationship should be established in the case of providing the cam surface 710d on the outer periphery of the nut 710.

Figure 28A:
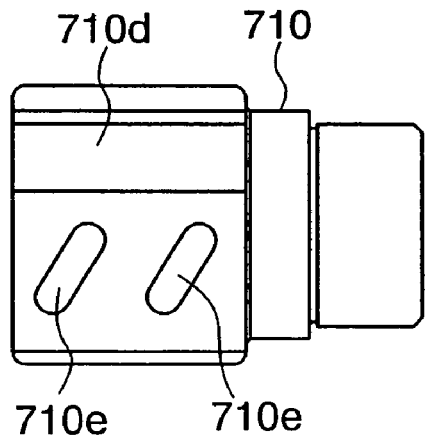
FIG. 28A is a side view of a nut, showing a positional relationship between a cam surface and a coma in the fourteenth embodiment.
Figure 28B:
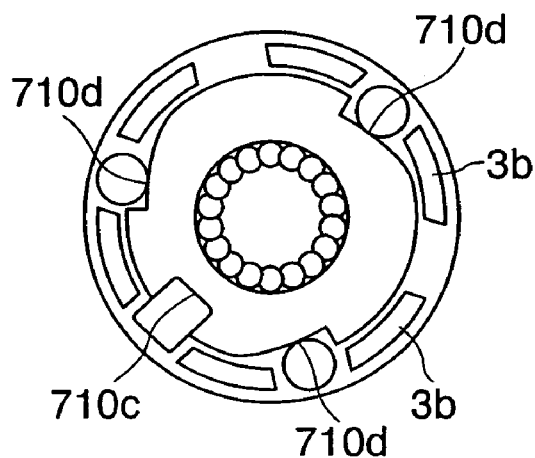

FIG. 28A is a side view showing a positional relationship between the cam surface and the coma in the fourteenth embodiment. FIG. 28B is a sectional view, similar to FIG. 27, showing this type of nut in an actual built-in state thereof. As apparent from FIGS. 28A and 28B, two pieces of comas 710e are disposed in positions where neither the keyway 710c between the pair of pawl portions 3b nor the cam surface 710d exists on the outer peripheral surface of the nut 710. Namely, the cam surface 710d is formed in deviation in a peripheral direction from the coma 710e. Note that the coma 710e is provided more inward than the external configuration of the nut 710 and is not therefore illustrated in FIG. 28B.

Figure 29A:
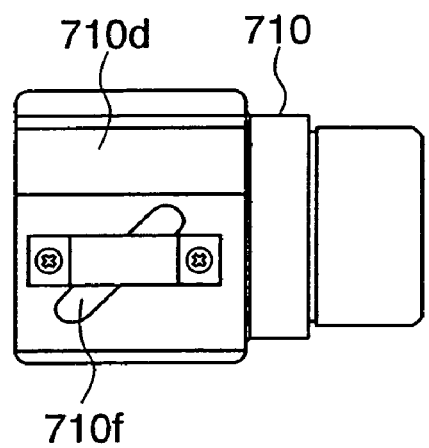
FIG. 29A is a side view of the nut, showing a positional relationship between the cam surface and a tube in a modified example of the fourteenth embodiment.
Figure 29B:
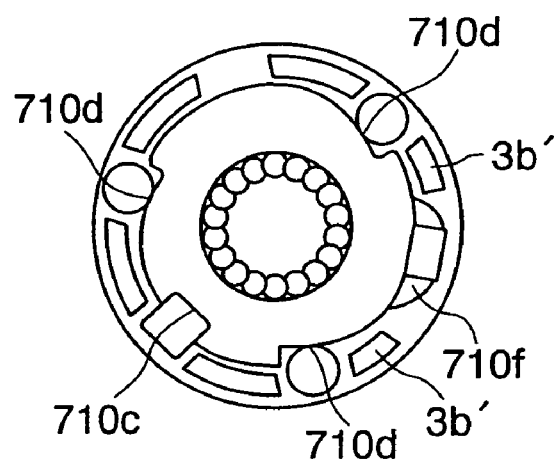

FIG. 29A is a side view of the nut, showing a positional relationship between the cam surface and the tube in a modified example of the fourteenth embodiment. FIG. 29B is a sectional view, similar to FIG. 27, showing this type of nut in an actual built-in state thereof. As apparent from FIGS. 29A and 29B, a tube 710f is disposed in a position where neither the keyway 710c between the pair of pawl portions 3b nor the cam surface 710d exists on the outer peripheral surface of the nut 710. Namely, the cam surface 710d is formed in deviation in a peripheral direction from the tube 710f, and hence an axis-line-directional length of the nut 710 can be restrained. It should be noted that an axis-line directional length of a pawl portion 3b' adjacent to the tube 710f is reduced in order to restrain interference with the tube 710f in the fourteenth embodiment.

Figure 30A:
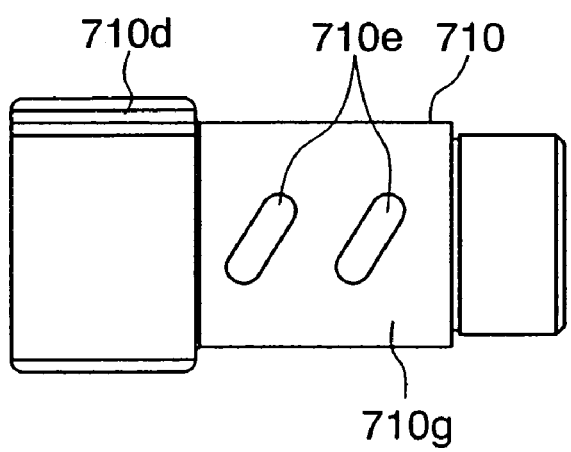
FIG. 30A is a side view of the nut, showing a positional relationship between the cam surface and the coma in another modified example of the fourteenth embodiment.
Figure 30B:
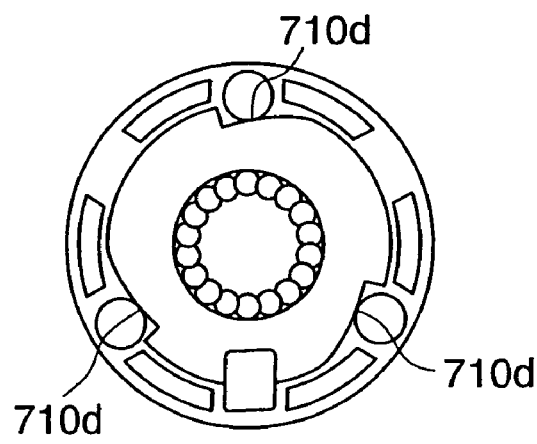

FIG. 30A is a side view of the nut, showing a positional relationship between the cam surface and the coma in another modified example of the fourteenth embodiment. FIG. 30B is a sectional view, similar to FIG. 27, showing this type of nut in an actual built-in state thereof. As apparent from FIG. 30A, the nut 710 has a diameter-reduced portion 710g of which a diameter is made smaller than the outer peripheral surface provided with the cam surface 710d, and the comas 710e are disposed in the diameter-reduced portion 710g. According to this modified example, the cam surface 710d is disposed in deviation in the axis-line direction from the comas 710e, so that the comas 710e can be disposed in arbitrary positions regardless of a disposition phase of the cam surface 710d, thereby raising a degree of freedom of design.

Figure 31:
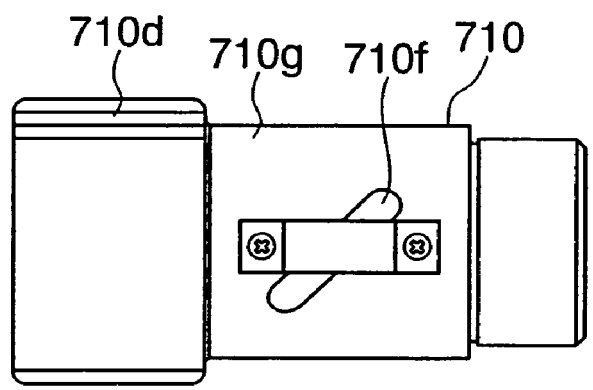
FIG. 31 is a side view of the nut, showing a positional relationship between the cam surface and the tube in still another modified example of the fourteenth embodiment.

FIG. 31 is a side view of the nut, showing a positional relationship between the cam surface and the tube in still another modified example of the fourteenth embodiment. According to this modified example, the cam surface 710d is disposed in deviation in the axis-line direction from the tube 710f, and therefore the tube 710f can be disposed in an arbitrary position irrespective of the disposition phase of the cam surface 710d, thereby increasing the degree of freedom of design.

Figure 32:
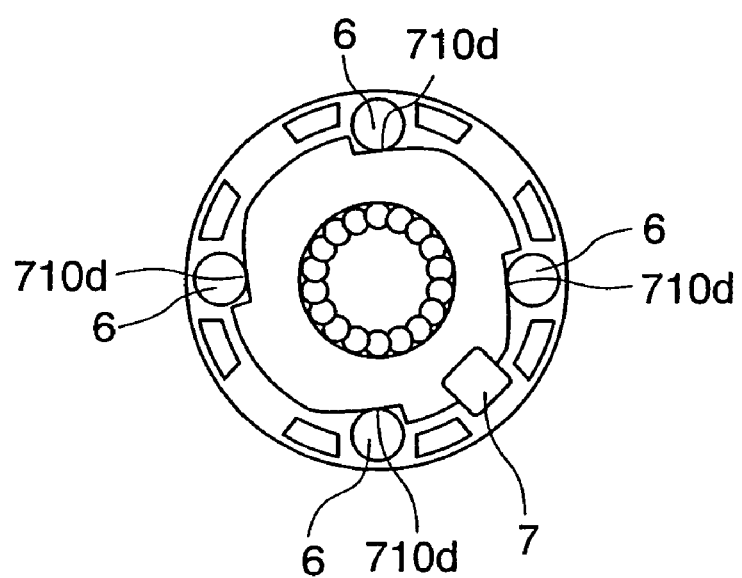
FIG. 32 is a sectional view, similar to FIG. 27, in a different embodiment.

FIG. 32 is a sectional view, similar to FIG. 27, showing a different embodiment. As shown in FIG. 32, the number of cam surfaces 710d and the number of rollers 6 can be set to arbitrary numbers (four pieces are each provided herein) in order to augment a load capacity of the ball screw mechanism. It is desirable that the number of keys 7, though a setting number may be arbitrary if equal to one or larger, be equal to or smaller than 6 in terms of balance.

The present invention has been discussed so far in a way that refers to the embodiment. The present invention should not, however, be construed as limited to the embodiments described above and can be, as a matter of course, properly changed and improved. Springs for biasing the rollers 6 and 106 to the second position may also be provided.

What is claimed is:

1. A linear actuator for driving a driven member, comprising:
   housing;
   an electric motor attached to said housing; and
   a power transmission mechanism for transmitting motive power of said electric motor to said driven member,
   said power transmission mechanism including:
   a fixing portion;
   a rotation driving portion so connected to said electric motor as to be capable of transmitting the motive power;
   a rotation driven portion receiving a rotational force from said rotation drive portion and getting rotationally displaced;
   a converting mechanism for converting a rotational motion of said rotation driven portion into an axis-line directional motion of a movable member so connected to said driven member as to be capable of transmitting the motive power; and a lock member disposed between said fixing portion and said rotation driven member, wherein when a rotational force is inputted to said rotation driving portion to rotate said rotation driven portion, said lock member is guided to a first position in which there decreases a frictional force with said fixing portion and said rotation driven portion, the transmission of the rotational force to said rotation driven portion from said rotation driving portion is thereby permitted, when the rotational force is inputted to said rotation driven portion to rotate said rotation driving portion relatively in one direction, said lock member is guided to a second position in which there increases the frictional force with said fixing portion and said rotation driven portion, the rotation to said rotation driving portion from said rotation driven portion is thereby fixed, and said rotation driven portion receives a force from said driven member so as to rotate in one direction at least in a state where said driven member is driven.

2. A linear actuator according to claim 1, wherein said converting mechanism includes a ball screw mechanism including a nut connected to a screw shaft, a ball and said rotation driven portion.

3. A linear actuator according to claim 2, wherein at least part of an axis-directional engagement portion between said rotation driving portion, said rotation driven portion is within a ball existing range of said ball screw mechanism.

4. A linear actuator according to claim 2, wherein said nut member has a circulation path for circulating said ball and is formed with a balancing cut portion on an outer peripheral surface on an opposite side with the axis line being interposed therebetween with respect to said circulation path.

5. A linear actuator according to claim 2, wherein at least one of a tube member formed with said circulation path and a press member for pressing said tube member is formed of a material having a specific gravity that is larger than that of said nut member.

6. A linear actuator according to claim 2, wherein said housing shields said power transmission mechanism in a state where said screw shaft can protrude outside, said housing includes a movable case attached to said screw shaft protruding from said housing, getting displaced together with said screw shaft in the axis-line direction with respect to said housing and incapable of a relative rotation with respect to said housing, and said movable case is so connected to said driven member as to be capable of transmitting the motive power.

7. A linear actuator according to claim 6, wherein a buffer member for buffering an impact when said movable case or said screw shaft abuts, is disposed in said housing.

8. A linear actuator according to claim 2, wherein said nut is said rotation driven portion.

9. A linear actuator according to claim 8, wherein a cam surface is formed on part of an outer peripheral surface of said nut, and said lock member moves along said cam surface between said first position and said second position.

10. A linear actuator according to claim 1, wherein said converting mechanism includes ball screw mechanism having a screw shaft connected to said rotation driven portion, a ball and a nut.

11. A linear actuator according to claim 10, wherein an output shaft of said electric motor and said screw shaft are coaxially connected in a butting state through a bush and said rotation driven portion.

12. A linear actuator according to claim 10, wherein there are provided at least a bearing for rotatably supporting one side end of said screw shaft and a bearing for rotatably supporting said rotation driven portion.

13. A linear actuator according to claim 10, wherein said nut is supported on said screw shaft in at least two positions with its thread groove being interposed therebetween.

14. A linear actuator according to claim 1, wherein a cam surface is formed on part of an outer peripheral surface of said rotation driven portion, and said lock member moves along said cam surface between said first position and said second position.

15. A linear actuator according to claim 1, wherein an aperture is provided in a position facing an axial center of said rotation driving portion in said housing.

16. A linear actuator according to claim 15, wherein there is provided a cover for shielding the aperture of said housing.

17. A linear actuator according to claim 1, wherein part of said rotation driving portion protrudes from the aperture provided in said housing.

18. A linear actuator according to claim 15, wherein an outer surface of a free end of said rotation driving portion on the side with which said rotation driven portion does not engage, is formed in a polygonal shape coaxial with said rotation (driving) portion.

19. A linear actuator according to claim 15, wherein a free end of said rotation driving portion on the side with which said rotation driven portion does not engage, is formed with a hole having an inner peripheral surface taking a polygonal shape coaxial with said rotation driving portion.

20. A linear actuator according to claim 2, wherein at least one of said screw shaft and said nut is disposed inward in a direction of a coil or a magnet of said electric motor.

21. A linear actuator according to claim 1, wherein said power transmission mechanism includes a planetary type speed reduction gear for transmitting the motive power of said electric motor.

22. A linear actuator according to claim 21, wherein said planetary type speed reduction gear has a sun gear connected to a rotary shaft of said electric motor, a planetary gear meshing with said sun gear and a carrier for rotatably supporting said planetary gear, and said rotation driving portion is connected to said carrier.

23. A linear actuator according to claim 21, wherein at least one of said screw shaft and said nut is disposed inward in a radial direction of said planetary type speed reduction gear.

24. A linear actuator according to claim 1, wherein said power transmission mechanism includes a driving body for driving said lock member when rotating said rotation driven portion upon inputting the rotational force to said rotation driving portion, and a restricting member for restricting the drive of said driving body when said driving body tries to drive said lock member toward said second position from said first position.

25. A linear actuator according to claim 1, wherein said power transmission mechanism includes a driving body for driving said lock member when rotating said rotation driven portion upon inputting the rotational force to said rotation driving portion, and a protruded portion so provided as to protrude in a radial direction from said rotation driven portion and serving to transmit the rotational force to said rotation driven portion from said rotation driving portion in a way that abuts on said driving body.

* * * * *